United States Patent
Defreitas et al.

(10) Patent No.: US 12,496,027 B2
(45) Date of Patent: Dec. 16, 2025

(54) SYSTEMS AND METHODS FOR LATERAL TREATMENTS OF THE BREAST

(71) Applicant: Hologic, Inc., Marlborough, MA (US)

(72) Inventors: Kenneth F. Defreitas, Patterson, NY (US); John Girgenti, New Milford, CT (US); Thomas Peter Dipersio, Boston, MA (US)

(73) Assignee: Hologic, Inc., Marlborough, MA (US)

( * ) Notice: Subject to any disclaimer, the term of this patent is extended or adjusted under 35 U.S.C. 154(b) by 0 days.

(21) Appl. No.: 19/104,468

(22) PCT Filed: Aug. 29, 2023

(86) PCT No.: PCT/US2023/031396
§ 371 (c)(1),
(2) Date: Feb. 18, 2025

(87) PCT Pub. No.: WO2024/049822
PCT Pub. Date: Mar. 7, 2024

(65) Prior Publication Data
US 2025/0255566 A1    Aug. 14, 2025

Related U.S. Application Data

(60) Provisional application No. 63/401,842, filed on Aug. 29, 2022.

(51) Int. Cl.
*A61B 10/02*    (2006.01)
*A61B 6/00*    (2006.01)
(Continued)

(52) U.S. Cl.
CPC ............ *A61B 6/502* (2013.01); *A61B 6/0414* (2013.01); *A61B 6/0421* (2013.01);
(Continued)

(58) Field of Classification Search
CPC ..... A61B 90/11; A61B 10/0233; A61B 90/17; A61B 2090/3908; A61B 6/502;
(Continued)

(56) References Cited

U.S. PATENT DOCUMENTS

| 4,450,536 A | 5/1984 | Schroeder |
| 4,869,378 A | 9/1989 | Miller |

(Continued)

FOREIGN PATENT DOCUMENTS

| CN | 301508169 | 4/2011 |
| EP | 1410764 | 4/2004 |

(Continued)

OTHER PUBLICATIONS

PCT International Search Report and Written Opinion in International Application PCT/US2023/031396, mailed Nov. 6, 2023, 13 pages.

*Primary Examiner* — Don K Wong
(74) *Attorney, Agent, or Firm* — Merchant & Gould P.C.

(57) ABSTRACT

An adapter for securing a biopsy guidance module to a breast imaging system includes an adapter body which includes a first side and an opposite second side. An armature extends from the first side of the body. A latch mechanism is disposed proximate an end of the armature distal from the first side of the body. The latch mechanism includes an adapter latch and an actuator. The adapter latch is configured to engage an interface on the breast imaging system. The actuator is engaged with the adapter latch to move the adapter latch from an unlocked position to a locked position. In the locked position, the adapter latch is releasably engaged with the interface. A keeper is disposed on the second side of the body. The keeper is configured to receive a module latch from the biopsy guidance module.

17 Claims, 19 Drawing Sheets

(51) Int. Cl.
   *A61B 6/04*    (2006.01)
   *A61B 6/50*    (2024.01)
   *A61B 90/11*   (2016.01)
   *A61B 90/17*   (2016.01)

(52) U.S. Cl.
   CPC ........ *A61B 6/4447* (2013.01); *A61B 10/0233* (2013.01); *A61B 90/11* (2016.02); *A61B 90/17* (2016.02)

(58) Field of Classification Search
   CPC ..... A61B 17/3403; A61B 34/20; A61B 34/25; A61B 2010/0208; A61B 5/708; A61B 2010/045; A61B 2018/1425
   See application file for complete search history.

(56) References Cited

U.S. PATENT DOCUMENTS

| | | | |
|---|---|---|---|
| 4,875,478 A | 10/1989 | Chen | |
| 4,879,508 A | 11/1989 | Andermo | |
| 5,047,036 A | 9/1991 | Koutrouvelis | |
| 5,053,042 A | 10/1991 | Bidwell | |
| 5,078,140 A | 1/1992 | Kwoh | |
| 5,249,583 A | 10/1993 | Mallaby | |
| 5,280,427 A | 1/1994 | Magnusson et al. | |
| 5,308,352 A | 5/1994 | Koutrouvelis | |
| 5,316,014 A | 5/1994 | Livingston | |
| 5,320,111 A | 6/1994 | Livingston | |
| 5,494,039 A | 2/1996 | Onik et al. | |
| 5,594,769 A | 1/1997 | Pellegrino | |
| 5,628,327 A | 5/1997 | Unger et al. | |
| 5,665,095 A | 9/1997 | Jacobson | |
| 5,769,086 A | 6/1998 | Ritchart | |
| 5,782,775 A | 7/1998 | Milliman | |
| 5,928,219 A | 7/1999 | Friend | |
| 6,030,348 A | 2/2000 | Unger | |
| 6,102,866 A | 8/2000 | Nields et al. | |
| D442,281 S | 5/2001 | Ericsson | |
| 6,270,506 B1 | 8/2001 | Sittek | |
| 6,331,437 B1 | 12/2001 | Cohen | |
| 6,447,447 B1 | 9/2002 | Mitsumori | |
| 6,464,648 B1 | 10/2002 | Nakamura | |
| 6,468,226 B1 | 10/2002 | McIntyre, IV | |
| 6,487,434 B1 | 11/2002 | Kaiser | |
| 6,665,554 B1 | 12/2003 | Charles et al. | |
| 6,712,773 B1 | 3/2004 | Viola | |
| 7,438,692 B2 | 10/2008 | Tsonton et al. | |
| D638,124 S | 5/2011 | Hirabayashi | |
| D643,923 S | 8/2011 | Senda | |
| 8,123,697 B2 | 2/2012 | Daum et al. | |
| 8,932,233 B2 | 1/2015 | Haberstich | |
| 8,945,014 B2 | 2/2015 | Zan | |
| D728,106 S | 4/2015 | Laukkanen | |
| 9,308,017 B2 | 4/2016 | Girgenti | |
| 9,314,926 B2 | 4/2016 | Bailey | |
| 9,937,016 B2 | 4/2018 | Girgenti | |
| 11,259,891 B2 | 3/2022 | Girgenti | |
| 11,284,869 B2 | 3/2022 | DeFreitas | |
| 11,398,022 B2 | 7/2022 | Vecchio | |
| 2001/0011156 A1 | 8/2001 | Viola | |
| 2001/0039378 A1 | 11/2001 | Lampman | |
| 2002/0065462 A1 | 5/2002 | Brabrand et al. | |
| 2002/0151820 A1 | 10/2002 | Dvorak | |
| 2002/0156376 A1 | 10/2002 | Wang | |
| 2003/0073895 A1 | 4/2003 | Nields et al. | |
| 2003/0199785 A1 | 10/2003 | Hibner et al. | |
| 2004/0077972 A1 | 4/2004 | Tsonton et al. | |
| 2005/0085838 A1 | 4/2005 | Thompson | |
| 2005/0261581 A1 | 11/2005 | Hughes | |
| 2005/0283069 A1 | 12/2005 | Hughes | |
| 2006/0241385 A1 | 10/2006 | Dietz | |
| 2006/0261571 A1 | 11/2006 | Mitchell | |
| 2007/0016067 A1 | 1/2007 | Webster, III et al. | |
| 2007/0032723 A1 | 2/2007 | Glossop | |
| 2008/0045833 A1 | 2/2008 | Defreitas et al. | |
| 2009/0030339 A1 | 1/2009 | Cheng et al. | |
| 2009/0131824 A1 | 5/2009 | Andrisek | |
| 2009/0171244 A1 | 7/2009 | Ning et al. | |
| 2009/0323892 A1 | 12/2009 | Hitzke | |
| 2010/0036245 A1 | 2/2010 | Yu et al. | |
| 2010/0113970 A1 | 5/2010 | Okada | |
| 2010/0160810 A1 | 6/2010 | Parihar | |
| 2010/0168723 A1 | 7/2010 | Suarez et al. | |
| 2010/0249647 A1 | 9/2010 | Nakayama | |
| 2010/0249648 A1 | 9/2010 | Nakata | |
| 2011/0015517 A1 | 1/2011 | Hughes | |
| 2011/0021947 A1 | 1/2011 | Nakayama | |
| 2011/0087132 A1 | 4/2011 | DeFreitas et al. | |
| 2011/0112540 A1 | 5/2011 | McLean | |
| 2011/0118625 A1 | 5/2011 | Akuzawa et al. | |
| 2011/0301414 A1 | 12/2011 | Hotto et al. | |
| 2012/0007863 A1 | 1/2012 | Endo et al. | |
| 2012/0010512 A1 | 1/2012 | O'Laughlin et al. | |
| 2012/0053455 A1 | 3/2012 | Okada | |
| 2012/0095329 A1 | 4/2012 | Kamiya | |
| 2012/0277625 A1 | 11/2012 | Nakayama | |
| 2012/0298820 A1 | 11/2012 | Manolidis | |
| 2013/0072816 A1 | 3/2013 | Girgenti | |
| 2013/0108138 A1 | 5/2013 | Nakayama | |
| 2013/0158565 A1 | 6/2013 | Anvari | |
| 2015/0313674 A1 | 11/2015 | DeFreitas et al. | |
| 2016/0296298 A1 | 10/2016 | Girgenti | |
| 2017/0079720 A1 | 3/2017 | Velusamy | |
| 2018/0256279 A1 | 9/2018 | Girgenti | |
| 2022/0257331 A1 | 8/2022 | Girgenti | |
| 2022/0370052 A1* | 11/2022 | DeFreitas | .......... A61B 10/0275 |
| 2024/0341709 A1 | 10/2024 | Ledan | |

FOREIGN PATENT DOCUMENTS

| | | |
|---|---|---|
| JP | 2004033753 | 2/2004 |
| JP | 1387271 | 5/2010 |
| JP | 1403094 | 12/2010 |
| WO | 00/28882 | 5/2000 |
| WO | 02/41794 | 5/2002 |
| WO | 2010113633 | 10/2010 |
| WO | 2013040017 | 3/2013 |
| WO | 2014081908 | 5/2014 |

* cited by examiner

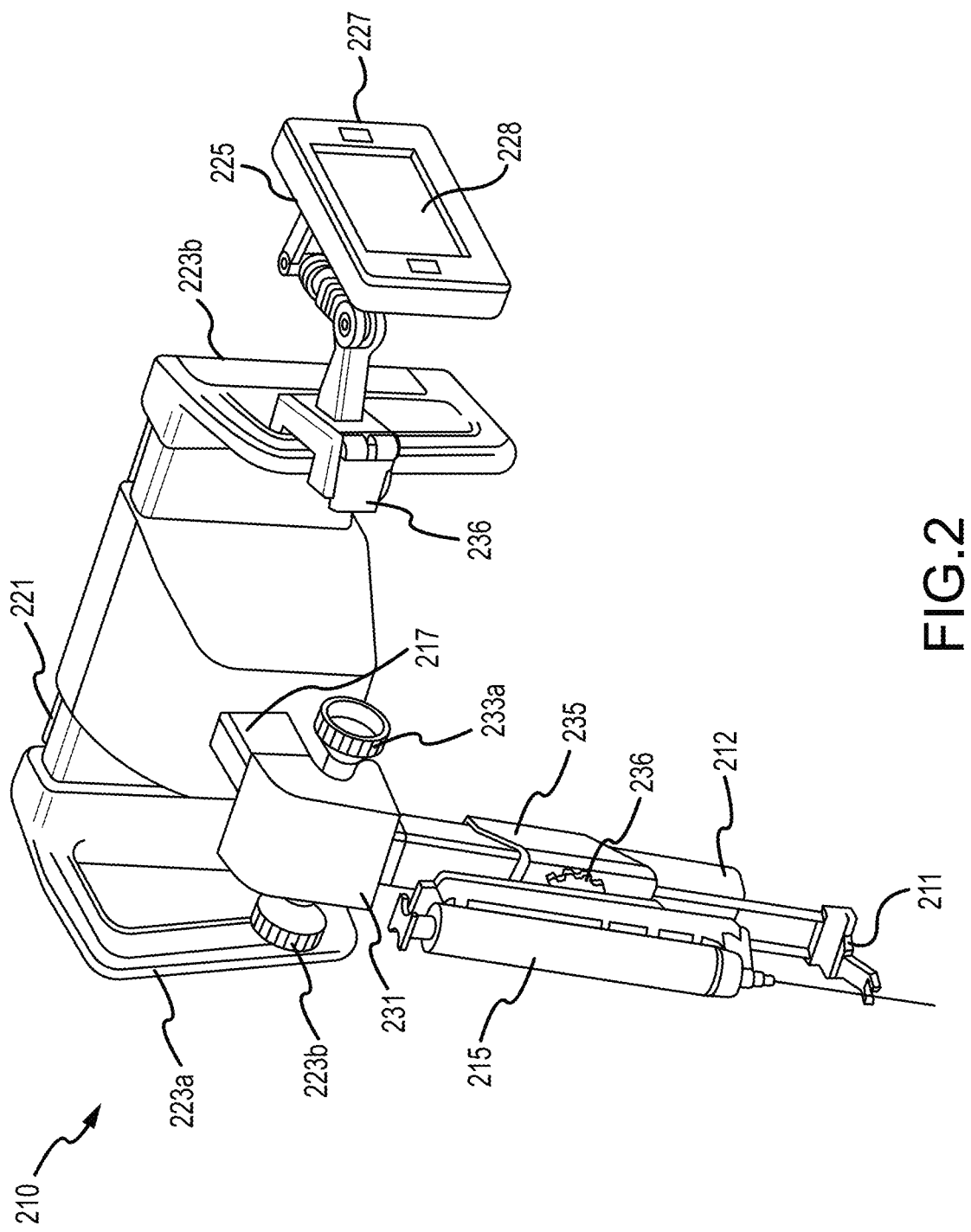

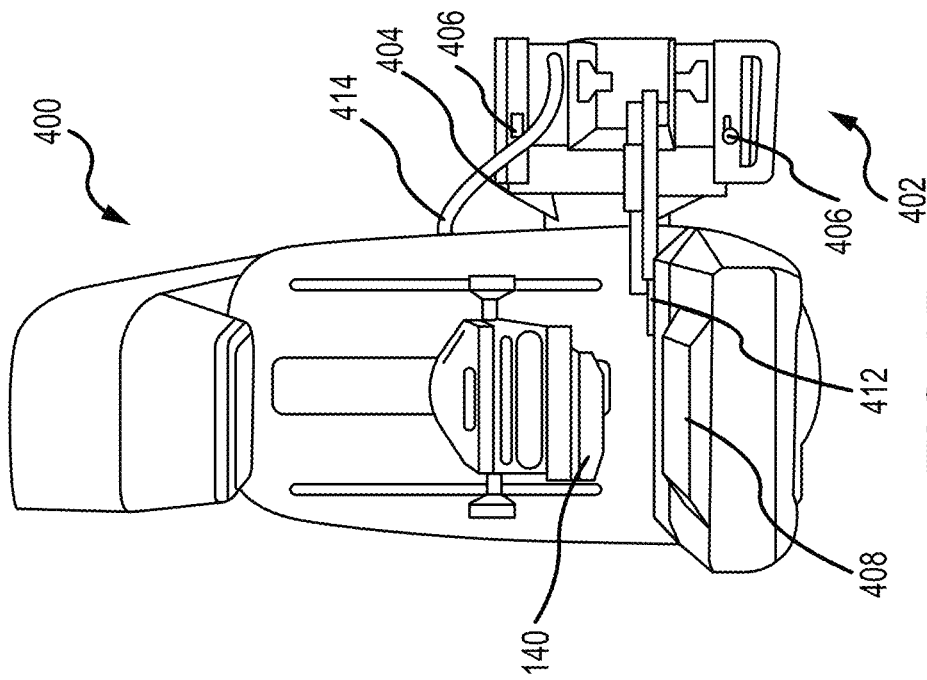
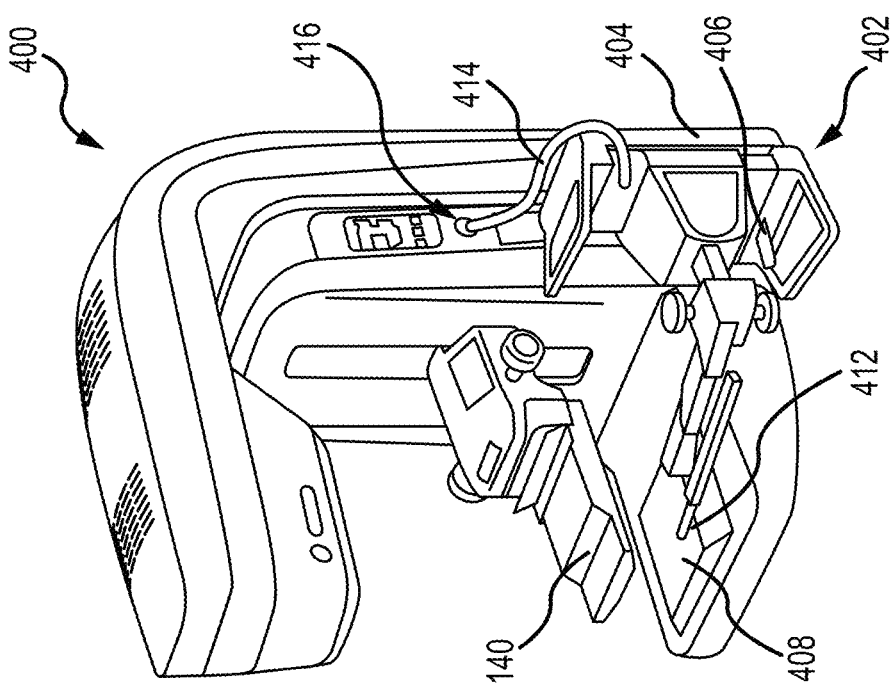

SYSTEMS AND METHODS FOR LATERAL TREATMENTS OF THE BREAST

CROSS-REFERENCE TO RELATED APPLICATION

This application is a National Stage Application of PCT/US2023/031396, filed on Aug. 29, 2023, which claims the benefit of U.S. Provisional Application No. 63/401,842, filed Aug. 29, 2022, the entire disclosures of which are incorporated herein by reference in their entireties. To the extent appropriate, a claim of priority is made to each of the above disclosed applications.

BACKGROUND

Mammography is a well-established method of breast imaging which may be used for breast cancer screening and diagnosis. Screening mammograms are preferably obtained annually. Should masses or calcifications ("regions of interest") be identified during a screening mammogram, the patient may require further diagnosis. Such diagnosis may involve taking a biopsy of the region of interest and analyzing excised tissue.

Various imaging modalities have historically been used during breast biopsies. The imaging modalities include ultrasound imaging, x-ray imaging and magnetic resonance imaging. Performing a breast biopsy typically involves positioning the patient, visualizing the region of interest using the imaging equipment, targeting coordinates of the region and retrieving cells or tissue from the targeted region. Cells or tissue may be retrieved in a variety of ways, including through open surgery, fine needle aspiration, core needle biopsy, or vacuum-assisted biopsy. Open surgery, the most invasive procedure, is generally performed by a radiologist placing a wire into the breast during visualization of the region of interest, where the wire extends into the region that is to be excised. The patient is then transferred to surgery and tissue is retrieved using the wire to locate the region of interest.

Fine needle aspiration, core needle biopsies and vacuum assisted biopsies are less invasive than open surgery, allowing cells and tissue to be obtained without the need for open surgery. All are needle biopsies, with the size of the needle, and thus the corresponding size (and number) of the biopsied samples, being differentiators. In each procedure the patient is positioned, the region of interest is visualized, the needle of the biopsy device is advanced to the target region of interest and the tissue is retrieved. Fine needle aspiration and core needle biopsy devices typically retrieve one tissue sample and their advancement to the target may be monitored using an imaging modality such as ultrasound. Vacuum-assisted biopsy devices generally have larger needles and can extract multiple cores.

Subsequent to a biopsy procedure, biopsy site markers can be delivered to the biopsy site under image guidance (e.g., ultrasound, x-ray imaging, etc.). The markers can be used to target the lesion during in a follow-up biopsy or a surgical procedure. Also, other minimally invasive procedure such as, for example, cryoablation, can be performed under image guidance.

X-ray imaging in stereotactic mode is generally used for breast biopsies because it is desirable to visualize and target regions in a three-dimensional volume. Stereotactic biopsies obtain volume information using x-ray images taken in at least two planes. The x-ray images are then processed to localize a target region of interest in three-dimensional space using the principal of parallax to determine the depth, or Z dimension, of the target region. This imaging modality may also be used for subsequent placement of biopsy site markers, as well as for procedures such as cryoablation.

SUMMARY

In one aspect, the technology relates to an adapter for securing a biopsy guidance module to a breast imaging system, the adapter includes an adapter body including a first side and an opposite second side; an armature extending from the first side of the body; a latch mechanism disposed proximate an end of the armature distal from the first side of the body, wherein the latch mechanism includes an adapter latch and an actuator, wherein the adapter latch is configured to engage an interface on the breast imaging system and wherein the actuator is engaged with the adapter latch to move the adapter latch from an unlocked position to a locked position, wherein in the locked position, the adapter latch is releasably engaged with the interface; and a keeper disposed on the second side of the body, wherein the keeper is configured to receive a module latch from the biopsy guidance module. In an example, the keeper includes a plurality of openings and wherein one of the plurality of openings is configured to receive the module latch. In another example, the adapter further includes a sensor disposed in the opening configured to receive the module latch, wherein the sensor is configured to detect a position of the module latch. In yet another example, the adapter further includes a first plurality of electrical contacts disposed to contact a second plurality of electrical contacts disposed on the biopsy guidance module. In still another example, the adapter further includes an umbilical cord extending from the adapter, wherein the umbilical cord is communicatively coupled to at least one of the first plurality of electrical contacts.

In another example of the above aspect, the keeper includes a pair of keepers, wherein each of the pair of keepers are disposed proximate opposite ends of the second side of the body. In an example, the adapter further includes a hanger disposed proximate the end of the armature for liftably engaging the adapter body with the interface of the breast imaging system. In another example, the latch mechanism includes an over-center mechanism.

In another aspect, the technology relates to a breast imaging system including: a gantry; an x-ray source rotatably coupled to the gantry; a breast immobilization structure rotatably coupled to the gantry independent of the x-ray source, wherein the breast immobilization structure includes: a breast support platform; a breast immobilization paddle movably coupled to a front side of the breast immobilization structure and movably engaged with the front side of the breast immobilization structure to move substantially orthogonally relative to the breast support platform; and an pair of interfaces on at least one of a rear side and two lateral sides of the breast immobilization structure for selectively operably connecting an adapter for a biopsy guidance module to the breast immobilization structure; and an x-ray detector disposed below the breast support platform. In an example, a first interface of the pair of interfaces is disposed on a rear side of the breast immobilization structure, on a first side of a dividing axis of the breast immobilization structure; and a second interface of the pair of interfaces is disposed on a rear side of the breast immobilization structure, on a second side of the dividing axis of the breast immobilization structure. In another example, the first interface includes a first plate facing towards a first lateral side of the two lateral sides of the breast imaging system, and wherein the second interface includes a second plate facing towards a second lateral side of the two lateral sides of the breast imaging system. In yet another example, each of the pair of interfaces includes an interface keeper for receiving an adapter latch on the adapter. In still another example, each of the pair of interfaces includes a hanger structure for selectively engaging the adapter with the interface.

In another example of the above aspect, hanger structure includes an opening in each of the pair of interfaces. In an example, the breast imaging system includes two substantially identical umbilical ports.

In another aspect, the technology relates to a method of attaching a biopsy guidance module to a breast imaging system having a breast immobilization structure including a breast support platform, the method includes: positioning a breast immobilization structure in an adapter-mounting position; engaging an adapter with the breast immobilization structure at an interface of the breast imaging system; selectively latching the adapter to the interface; positioning the breast immobilization structure in a procedure-ready position; engaging the biopsy guidance module with the adapter; and selectively latching the biopsy guidance module to the adapter. In an example, positioning the breast immobilization structure in the procedure-ready position includes engaging an umbilical cord from the adapter with a port on the breast imaging system. In another example, in the procedure-ready position, the interface is substantially vertical; and in the adapter-mounting position, the interface is disposed at an angle to the procedure-ready position. In yet another example, the angle is approximately 90 degrees. In still another example, the method further includes disengaging the biopsy guidance module from a front side of the breast immobilization structure, prior to engaging the biopsy guidance module with the adapter. In another example, engaging the adapter with the breast immobilization structure comprises activating a supplemental lock.

BRIEF DESCRIPTION OF THE DRAWINGS

FIG. 2 depicts an example of a treatment guidance module with a mounted biopsy device.

FIGS. 6A and 6B are partial front perspective and front views, respectively, of an x-ray imaging system with a treatment guidance module in a lateral orientation.

DETAILED DESCRIPTION

Breast x-ray imaging systems such as tomosynthesis and mammography systems generally include an x-ray source mounted on a rotatable arm of a gantry and an x-ray detector positioned generally normal to the x-ray source when the x-ray source is at zero position. During tomosynthesis image acquisition, the x-ray source is rotated over a limited angular range. At various points in the x-ray source trajectory the source is activated and an image is captured by the detector. Each image captured at each point is referred to as a projection image. Computer programs are used to reconstruct a three-dimensional volume from the projection images and the three-dimensional volume is used for lesion detection.

Treatment guidance modules may be secured to x-ray imaging systems to enable image guided treatment of a patient breast. One such treatment is the performance of biopsy on the breast tissue. Biopsy is often performed such that the needle penetrates an upper surface of the breast. For particularly thin breasts, it may be desirable to enter the breast from a lateral position. Such a lateral approach may also be used on larger breasts, as required or desired for a particular application. Lateral breast biopsy typically requires additional components to enable mounting of a biopsy needle in a lateral position. This can lead to greater cost or confusion if such parts are misplaced within a breast imaging suite as such parts may be inadvertently damaged. Other treatments may include those that require specific image-guided targeting of treatment sites. Such treatments include, but are not limited to, the placement of biopsy site markers (usually performed subsequent to a biopsy), and cryoablation. For clarity and ease of description, biopsy procedures (and thus "biopsy guidance modules") are described primarily herein, but it will be understood to a person of skill in the art that other treatments that benefit from targeted image-guided intervention may also be performed with the guidance systems described herein.

The technologies described herein incorporate an adapter with an x-ray imaging system, such that a biopsy guidance module (used for upright breast biopsy) may also be used for lateral breast biopsy. The adapter may be configured to provide automatic electrical connections to the biopsy guidance needle, allowing for quick communication with the x-ray imaging system, once mounted. The adapter may be mounted on either side of a breast immobilization structure, such that left or right lateral biopsy may be performed. The adapter may be secured to the x-ray imaging system while the breast immobilization structure thereof is in a variety of positions, though some positions described herein may be particularly advantageous.

Figure 1:
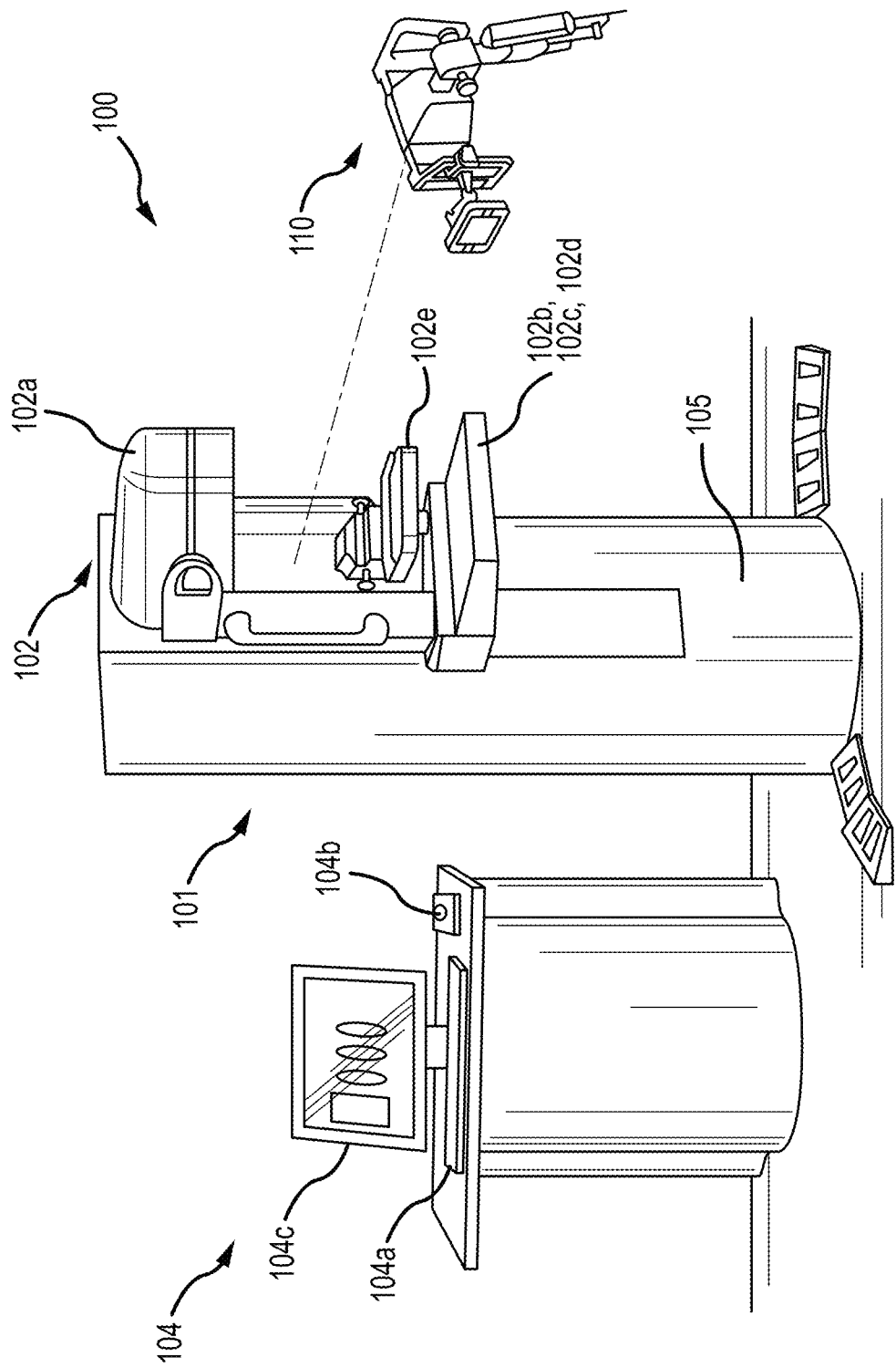
FIG. 1 depicts an x-ray imaging system incorporating a treatment guidance module.

FIG. 1 depicts an x-ray imaging system 100 (which may be a mammography, tomosynthesis, or combination system) incorporating a treatment guidance module. In the depicted configuration, the treatment guidance module incorporates a biopsy device. The x-ray imaging system 100 is shown to include an acquisition work station (AWS) 104 and gantry 101 supporting an x-ray imaging assembly 102. Such an x-ray imaging system 100 is currently available from the common assignee under the trade name Selenia Dimensions, and is representative of merely one x-ray system on which the biopsy guidance module 110 described herein may be mounted. The gantry 101 supports a C-arm 103 that can move up or down along the gantry 101 to a selected height, driven by motor(s) controlled by technologist operating the system. C-arm 103 carries an x-ray tube 102a at an upper end and a breast support platform 102b at a lower end. Support platform 102b covers a flat panel x-ray image receptor 102c, spaced from the support platform 102b by a focused anti-scatter grid 102d (which may be retractable so that it can be removed from the space between support platform 102b and receptor 102c). The C-arm 103 also carries an immobilization paddle 102e that is between source 102a and breast support platform 102b and is motorized to move away from support platform 102b so a patient's breast can fit between support platform 102b and paddle 102e, and closer to support platform 102b so the patient's breast can be compressed and immobilized. Together, the portion of the C-arm 103 that carries the biopsy guidance module 110, and the immobilization paddle 102e, along with the breast support platform 102b form a "breast immobilization structure". The movement of paddle 102e is motorized and controlled by the health professional. Paddles 102e of different size and different configurations can be fitted on the gantry 101 to suit different breast sizes or to suit imaging needs (i.e., for screening or diagnosis). In addition, the technologist can move paddle 102e along the width of support platform 102b to a position in which paddle 102e matches the position of a breast that is not centered on support platform 102b, as in the Selenia system currently offered by the common assignee. The system 100 further includes other components, such as a control station 104 having interface devices such a keyboard 104a and trackball 104b, a display screen 104c, and control and image processing facilities. A biopsy guidance module 110 may easily be mounted in between the x-ray source and the x-ray detector of the imaging system 102 for upright biopsy procedures. Other examples of biopsy guidance modules are described herein, for example, in the context of FIG. 11B.

FIG. 2 depicts an example of a treatment guidance module 210 with a mounted biopsy device 215, although as noted above, treatment instruments such as cryoablation devices may be utilized. Support bracket 221 extends between handles 223a and 223b, which facilitate transport of the biopsy guidance module 210. The biopsy guidance module 210 includes components for controlling the movement of the biopsy device 215. The biopsy device may be, for example, an Eviva™ vacuum-assisted biopsy device manufactured and sold by Hologic, Inc. Fixed support arm 217 extends from the guidance module to connector 231. In one embodiment connector 231 connects angular support arm 212 to the fixed support arm 217 at a fixed angle. Alternative embodiments which include adjustment mechanisms for varying the angle of displacement between the angular support arm 212 and the fixed support arm 217 may be substituted herein as equivalents. Holster mount 235 is moveably coupled to the angular support arm 212. The linear movement may be mechanically controlled (i.e., via the associated motors and controllers) and/or may be manually controlled using either or both of the thumbwheel knobs 233a and 233b. The holster mount 235 includes an attachment mechanism 236 that is adapted to receive biopsy holster 213. The biopsy device 215 sits within the biopsy holster 213. A needle support 211 may advantageously be coupled to the holster mount 235 for needle stabilization. A control module 225 may be mounted to either of the handles, 223b or 223a via clamp 236. In other examples, a control module 225a may be mounted so as to be visible in a number of different orientations of the biopsy guidance module (for example, on the support bracket 221). In various embodiments, each handle 223a, 223b may include one or more electrical connectors which enable communication between the clamped control module 225 and the guidance module 219, and the medical professional may move the control module to either handle 223a, 223b as a matter of preference. The control module 225 includes a user interface that enables the medical professional to control the biopsy procedure without the need to leave the patient. The control module 225 includes a display 228 for displaying a status or other information about the biopsy, and one or more buttons 227 for controlling the movement of the biopsy device 215 during the procedure. It is contemplated that the display may include a touch screen interface for controlling the display and/or movement of the biopsy device during the procedure.

Figure 3A:
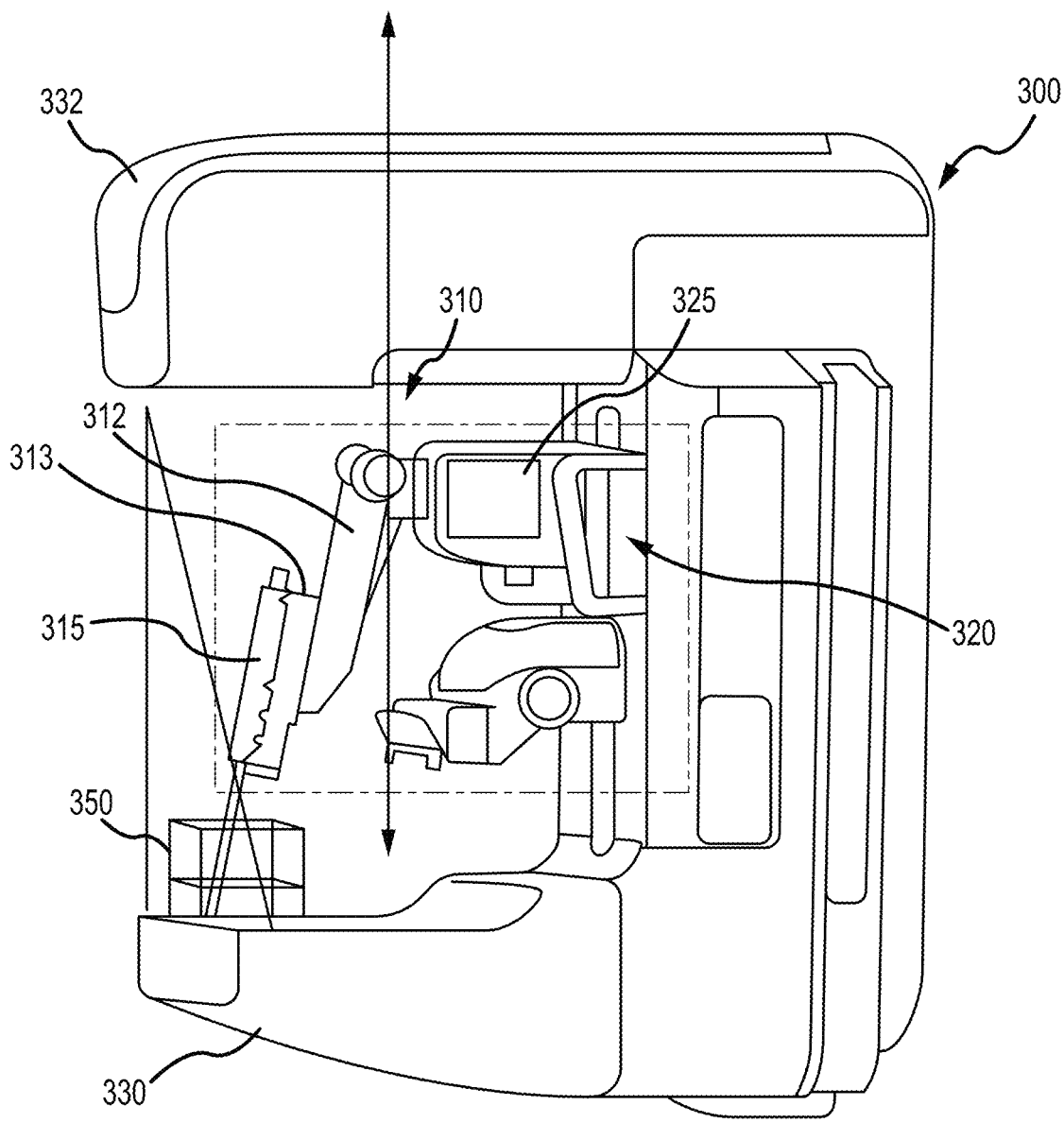
FIGS. 3A and 3B are partial perspective views of another x-ray imaging system and treatment guidance module.
Figure 3B:
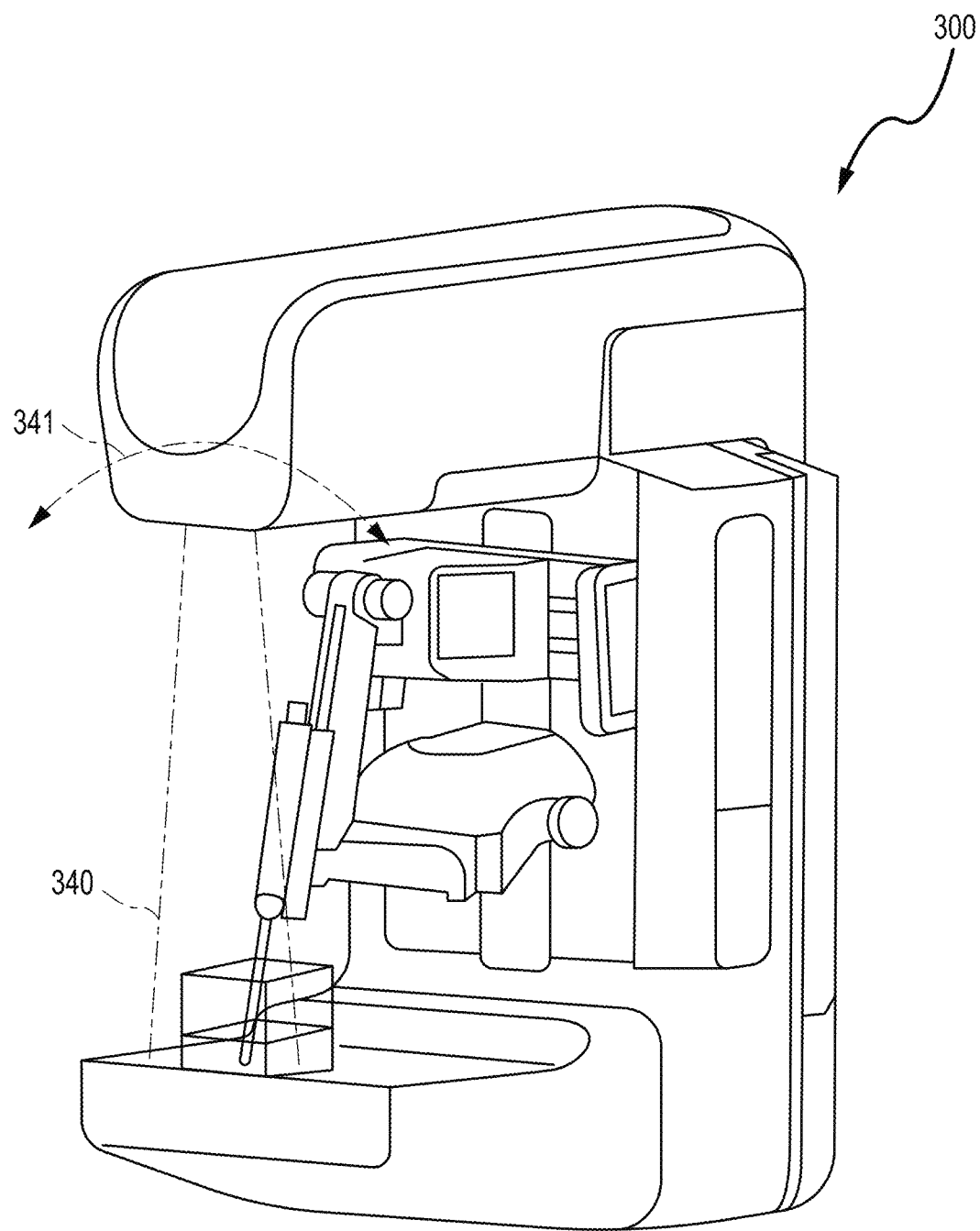

FIGS. 3A and 3B are partial perspective views of another x-ray imaging system 300 and treatment guidance module 310. An exemplary x-ray imaging system 300 may include a tube head 332 supporting a cone beam or other x-ray source, and a compression platform 330 encasing an x-ray detector. The tube head 332 is rotatably mounted so as to enable the tube head to rotate in along an angular trajectory generally designated by the dashed line 341 in FIG. 3B. In one example the biopsy guidance module 310 includes clamps, hooks or other attachment elements (e.g., as depicted in FIG. 4) for mounting the biopsy guidance module 310 to the C-arm 321 of the x-ray imaging system 300.

In the example of FIGS. 3A and 3B, the holster 313 is coupled to the holster mount (not shown) on a fixed angle arm 312, and the fixed angle arm 312 is fixedly mounted on the support arm 317 at an angle offset from normal by 10 degrees, although it is readily appreciated that the offset angle may vary as required or desired for a particular application. Angling the arm 312 (and by consequence the biopsy device 315) allows the biopsy device 315 to be advanced to a desired location within a biopsy target area (indicated generally by the target area 350) without the biopsy device 315 and holster 313 introducing artifacts into the x-ray image. As shown in FIG. 3B, the cone beam 340 will extend into the target area 350, but the device 315 does not fall within the cone beam 340. It should be noted that although a 10 degree fixed angle is disclosed, the present technology is not limited to any particular fixed angle and it is appreciated that the selected fixed angle may differ in response to particular geometries of the imaging systems and tissue removal tools. The tube head 332 may also rotate along an imaging scan angle 341 during, e.g., tomosynthesis imaging.

Figure 4:
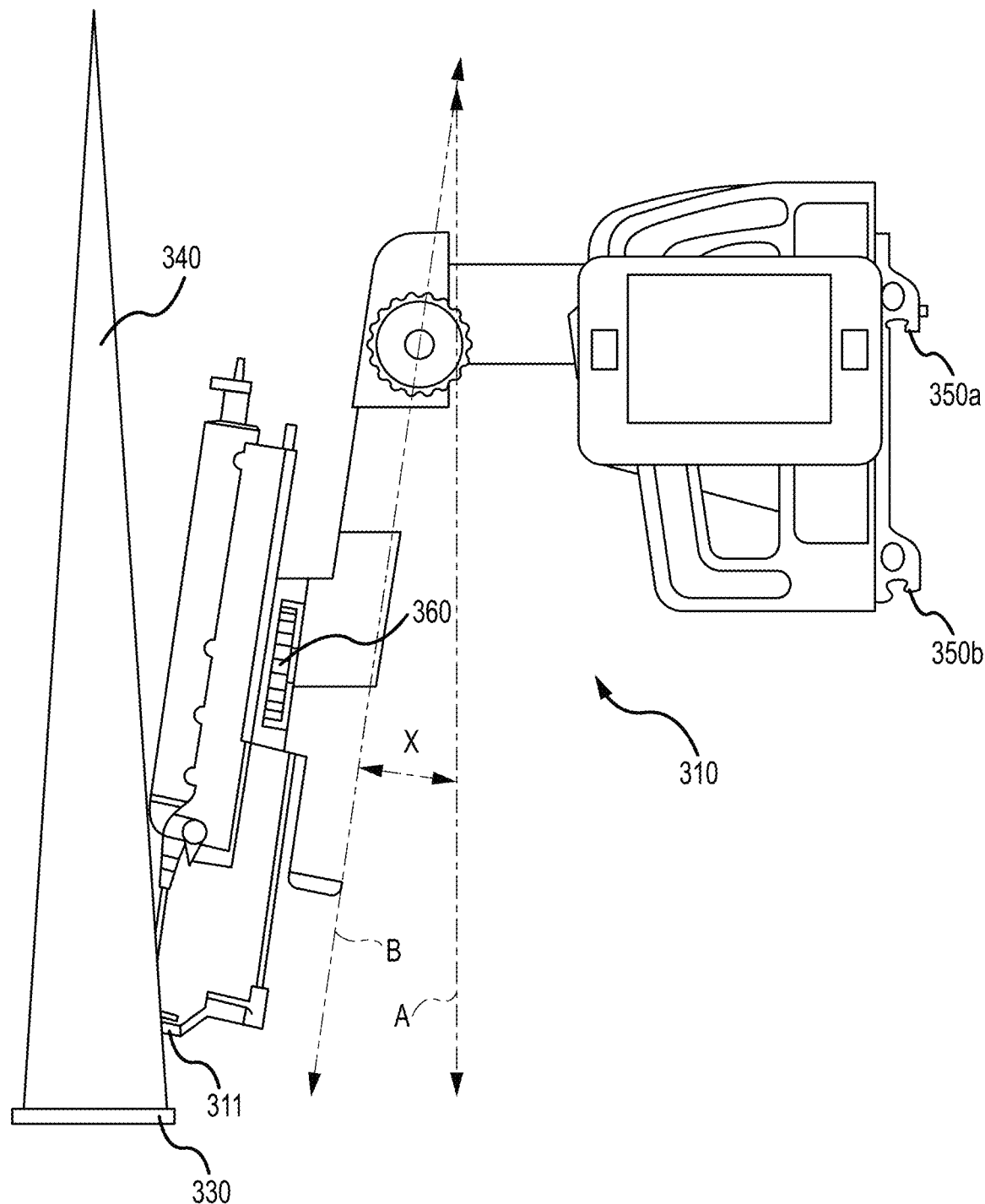
FIG. 4 is a side view of the treatment guidance module.

FIG. 4 is a side view of the treatment guidance module 310. In FIG. 4, line A is within a plane that is "normal" to the plane of the x-ray detector 330. Line B illustrates the angular displacement of the biopsy device 315, and therefore the device 315 is offset from the normal by an angular measure of X, depending on application, though 10 degrees, as described above, may be advantageous. As a result, the biopsy device will interfere with biopsy imaging.

Also shown in more detail in FIG. 4 are exemplary coupling elements 350a and 350b of the biopsy guidance module 310. The coupling mechanisms 350a and 350b are adapted to mate with complementary features of the gantryarm. Other types of coupling elements, including latches, hooks, slots, and the like may be readily substituted herein as equivalents. Further structure of the coupling elements 350a, 350b are described herein in the context of FIG. 7F.

Figure 5:
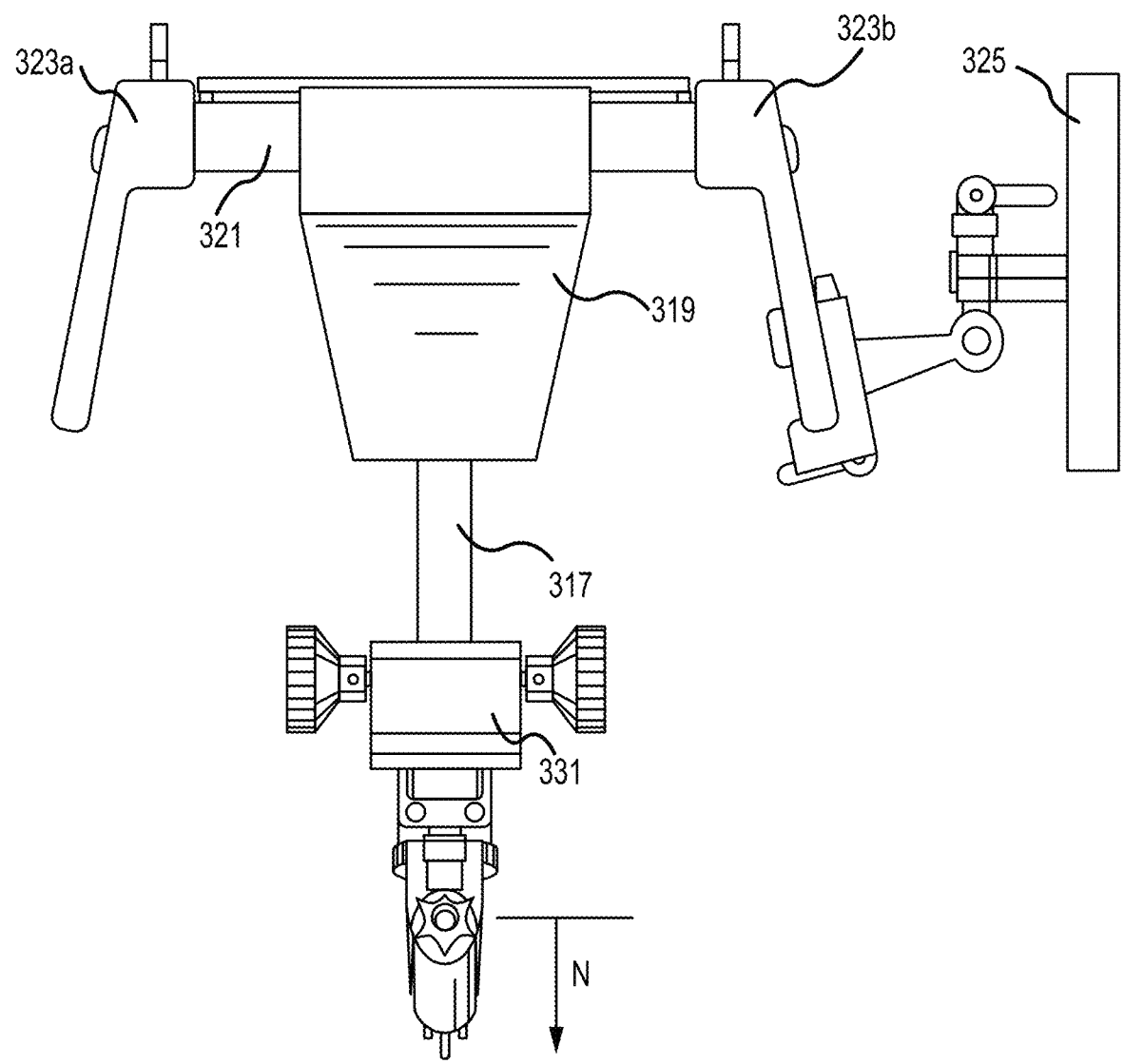
FIG. 5 is a top view of the treatment guidance module.

FIG. 5 is a top view of the treatment guidance module 310. Only a subset of components are labeled for ease of reference. When viewing the biopsy guidance module 310 from this perspective, the displacement or reach N of the needle tip which results from the angular tilt of the biopsy guidance module 310 is readily apparent.

FIGS. 6A and 6B are partial front perspective and front views, respectively, of another example of x-ray imaging system 400 with a treatment guidance module 402 in a lateral orientation. FIGS. 6A and 6B are described concurrently and not every element or feature is depicted in each figure. The biopsy guidance module 402 is secured to the x-ray imaging system 400 via an adapter 404. The adapter 404 allows the same biopsy guidance module 402 used in the upright biopsy configuration depicted in FIGS. 1-5 to be used in a lateral configuration. This has a number of advantages, in that the only a single biopsy guidance module 402 is needed. Prior lateral approaches require additional structure such as a lateral arm that is secured to the post of the biopsy guidance module 402 in order to perform lateral biopsy procedures. These lateral arms could be cumbersome, difficult to secured to the post, and less robust than the biopsy guidance module 402 itself. The biopsy guidance module 402 is secured to the adapter 404 by actuation of a module latch actuator 406, two of which are depicted in FIG. 6B (only one module latch actuator 406 is visible in FIG. 6A).

FIGS. 6A and 6B depict a partial view of an x-ray imaging system, namely a breast immobilization structure including a breast support platform 408 and a breast immobilization paddle 410, as well as a tube head. In FIGS. 6A and 6B, the components are described as "procedure ready," in that all necessary components are connected so as to enable performance of a breast treatment (e.g., a biopsy). Typically, treatments such as biopsies are performed when the imaging system 400 is in the depicted upright position (corresponding to a cranial caudal or CC orientation). In other examples, treatments may be performed in a mediolateral oblique or MLO orientation. In this procedure-ready position depicted in FIGS. 6A and 6B, the breast immobilization structure is in the upright position (e.g., such that a patient breast may rest on the breast support platform 408 and be immobilized by the breast immobilization paddle 408). In the procedure-ready position, the biopsy guidance module 402 is connected to the adapter 404, which is in turn connected to the x-ray imaging system 400, as described herein. The biopsy needle 412 secured to the biopsy guidance module 402 is substantially parallel to an upper surface of the breast support platform 410. In other examples, when the biopsy guidance module 402 is in the procedure-ready position of FIGS. 6A and 6B, the biopsy needle 412 may be substantially parallel to a front face of the breast support platform 410, which may abut the chest wall of the patient. As used in this context, "procedure-ready" means a position where a biopsy procedure may be performed on a patient breast, though some additional adjustments of the various components of the biopsy guidance module 402 and/or the x-ray imaging system 400 itself may be required, desired, or otherwise possible to target a region of interest in the breast. In another example, an umbilical cord 414 (containing power and/or control wiring) extending from the biopsy guidance module 402 may be connected to a port 416 on the x-ray imaging system 400 in the procedure-ready position.

Figure 7A:
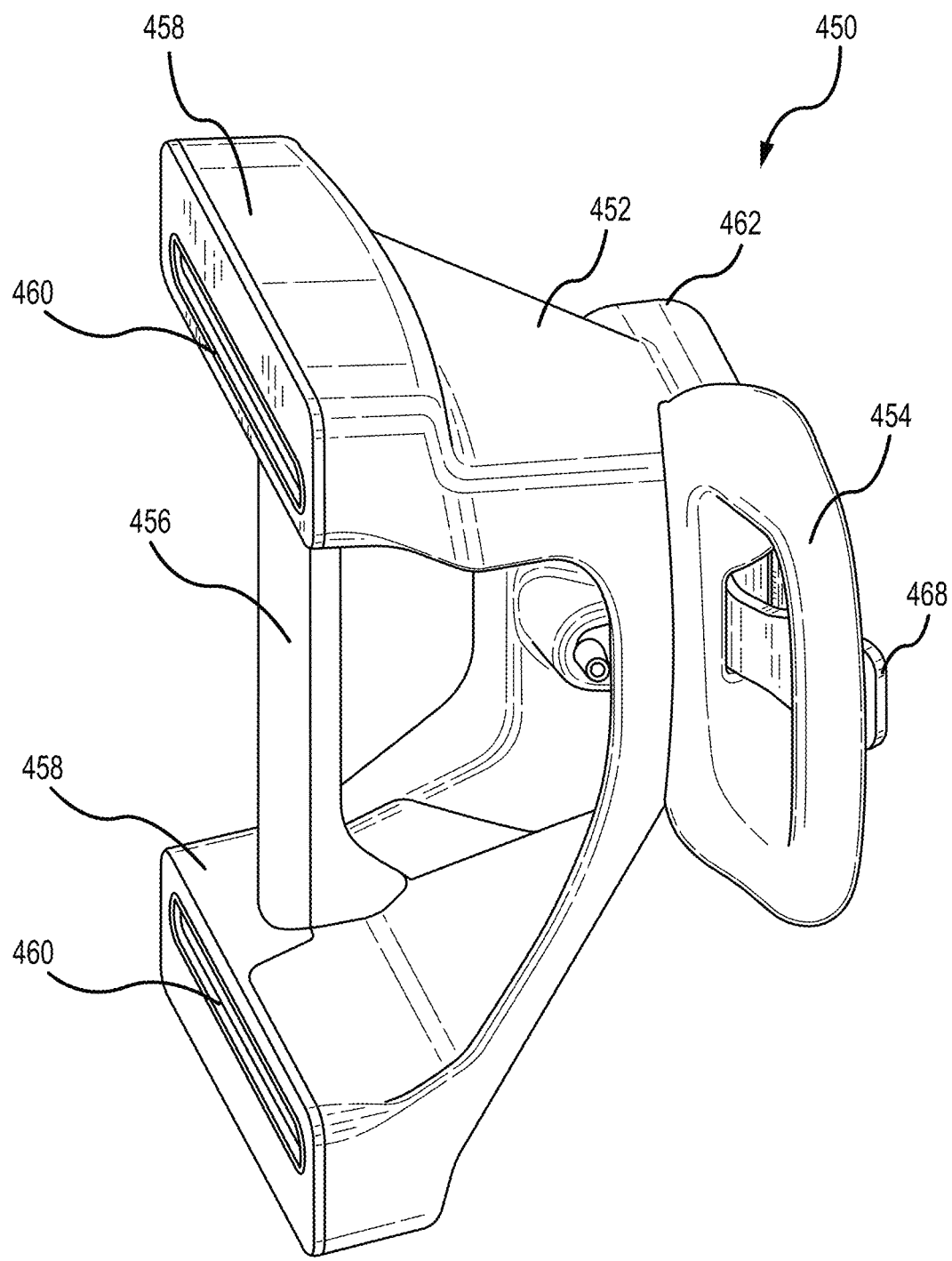
FIGS. 7A and 7B are top and bottom perspective views, respectively, of an adapter for securing a treatment guidance module to an x-ray imaging system in a lateral orientation.
Figure 7B:
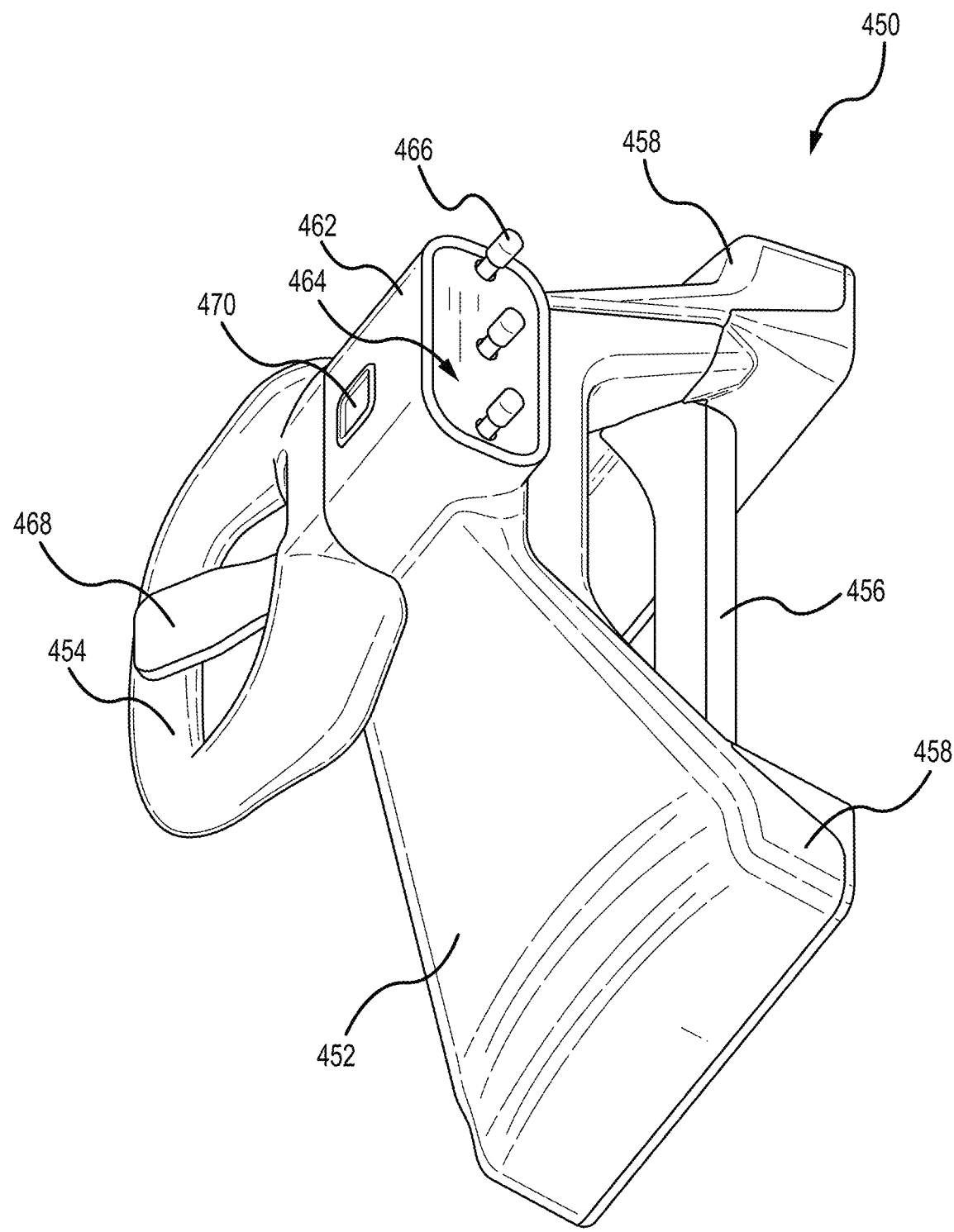

FIGS. 7A and 7B are top and bottom perspective views, respectively, of an adapter 450 for securing a treatment guidance module to an x-ray imaging system in a lateral orientation. In this orientation, the adapter 450 may be described as "procedure-ready" as that term is defined herein. The imaging system may be a breast imaging system 100 such as depicted in FIG. 1 and elsewhere herein, while the treatment guidance module may be a biopsy guidance module 110 such as depicted in FIG. 1 and elsewhere herein. FIGS. 7A and 7B are described concurrently and not all features described are depicted in both figures. The adapter 450 includes a body or housing 452 that may be configured as required or desired for a particular application. The body or housing 452 may include one or more structures that act as handles to improve gripability, positioning, and movement thereof. For example, a handle 454 and a tie 456 may be gripped by a technologist as required. The tie 456 may span a pair of struts 458, each configured to receive a keeper 460 that engages with a treatment guidance module. An armature 462 extends from a rear of the body or housing 452. The armature 462 defines an engagement surface 464 from which extends a plurality of locking bolts 466 for locking the adapter 450 to an imaging system, as described elsewhere herein. The locking bolts 466 may be actuated by a lever arm 468 that, in this configuration, projects from the armature 462. A supplemental lock 470 may fix a position of the lever 468 when in the locked position, so as to prevent inadvertent disengagement thereof. The supplemental lock 470 is depicted here as a button that may actuate an electromechanical locking element. In another example, the button may actuate a detent or other mechanical lock that engages with (or disengages from, or otherwise prevents movement of) the lever 470 or the locking structure to which the lever 470 is engaged. Other supplemental lock structures would be apparent to a person of skill in the art.

Figure 8A:
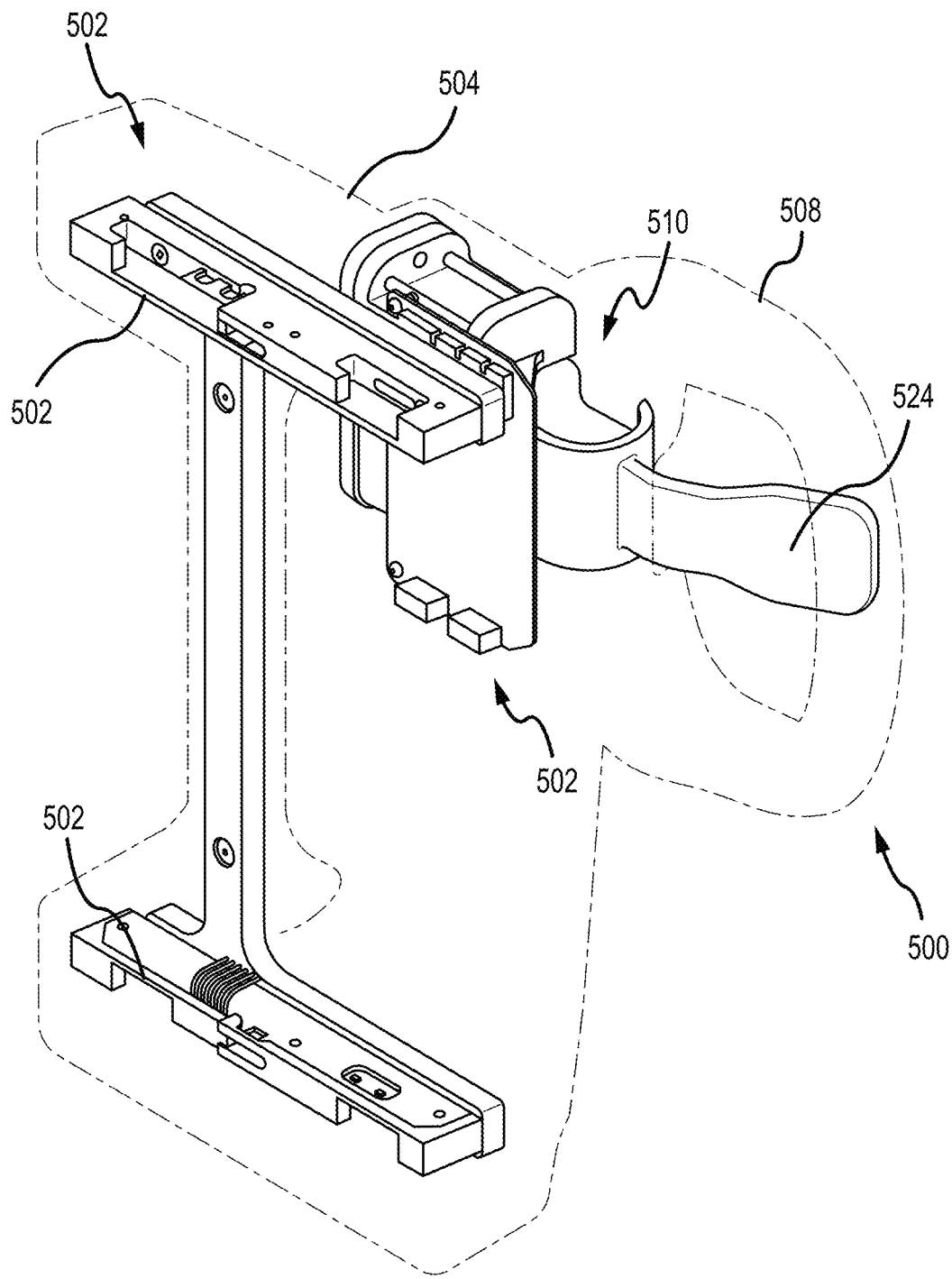
FIG. 8A is a perspective view of an adapter for securing a treatment guidance module to an x-ray imaging system in a lateral orientation.

FIG. 8A is a perspective view of an adapter 500 for securing a treatment guidance module to an x-ray imaging system in a lateral orientation. An outer body or housing 504 of the adapter 500 is depicted in dashed lines so as to depict more clearly the internal structures and components described herein. The housing 500a may have a form factor similar to that of the adapter depicted in FIGS. 7A and 7B, or may have different curvatures, surface textures, dimensions, structures, etc. As such, the housing 504 of the lateral adapter 500 is depicted as dashed in the following figures, while the internal components thereof are described in more detail. Other views of the adapter 500 or parts thereof are depicted in FIGS. 8B-8F. As such, FIGS. 8A-8F are generally described concurrently, and not every component depicted is visible or marked in every figure. Certain components are only described in the context of certain figures. In FIG. 8A, the adapter 500 is positioned in a procedure-ready position, as described in more detail herein. In general, when the adapter 500 is in the procedure-ready position (further depicted above in the context of FIGS. 6A and 6B), keepers 502 are in a generally horizontal configuration. The adapter body 504 that may be configured as required or desired for a particular application (e.g., to attach to a particular x-ray imaging system or to have a particular biopsy guidance module attached thereto). The adapter 500 may also include an armature 506 extending from a rear side of the adapter body 504. A handle 508 may also extend from the armature 506 or some other portion of the adapter body 504 to make lifting, moving, or connecting the adapter 500 to the x-ray imaging system easier. The keepers 502 are disposed at opposite ends of the adapter body 504, and generally face towards the front side thereof, which is opposite the rear side. A latch mechanism 510 is disposed proximate an end of the armature 506 and is utilized to selectively connect the adapter 500 to an x-ray imaging system. The adapter 500, keepers 502, handle 508, latch mechanism 510, and other components are generally configured so the adapter 500 may be secured on a first side or a second side of the breast immobilization structure of the x-ray imaging system.

Figure 8B:
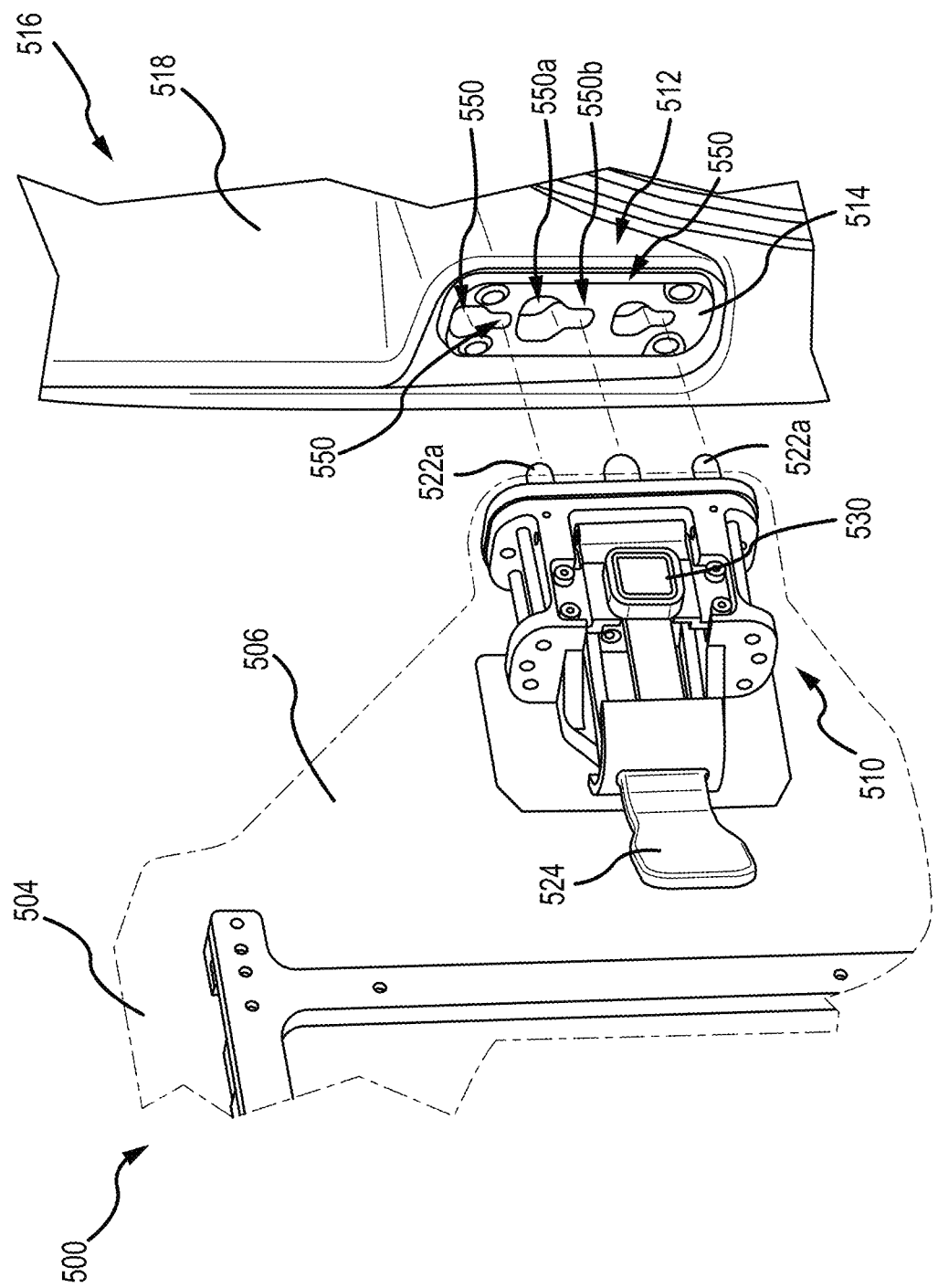
FIG. 8B is a partial exploded perspective view of an interface of the x-ray imaging system and the adapter of FIG. 8A, including a latch mechanism.
Figure 8C:
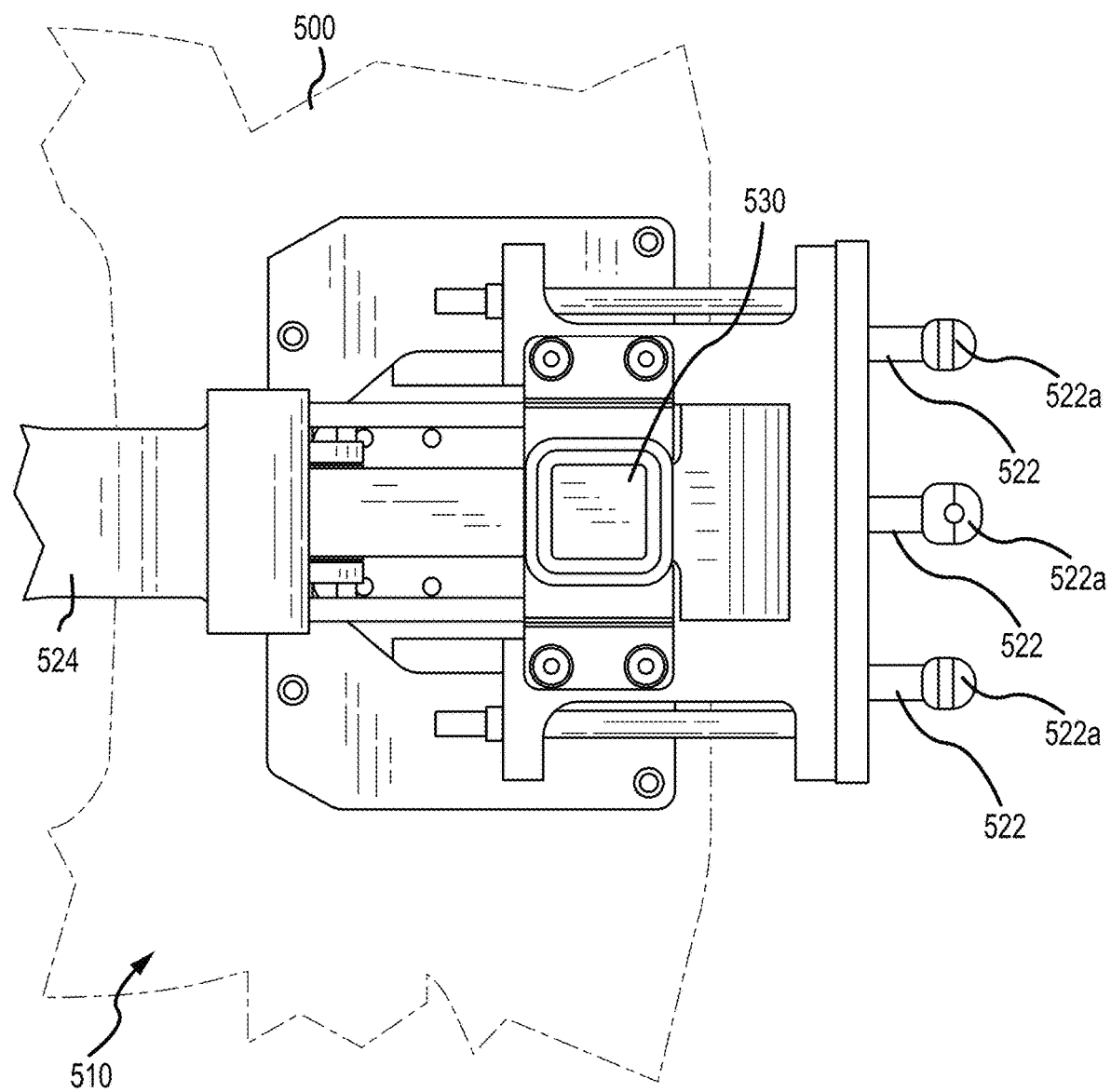
FIG. 8C is an upright rear view of the latch mechanism of the adapter of FIG. 8A.

FIG. 8B is a partial exploded perspective view of an interface 512 of an x-ray system 516 and the adapter 500 of FIG. 8A, including the latch mechanism 510. The interface 512 may include a robust plate 514 or other structure rigidly secured to a robust structural element of the x-ray imaging system 516, for example, to the breast immobilization structure 518. The plate 514 defines a plurality of openings 520, each having a receiving portion 520a and a retention portion 520b. The receiving portion 520a is configured to receive an associated bolt 522, each of which include an enlarged head 522a. The enlarged head 522a is sized so as to be received on the receiving portion 520a of an opening 500. Thereafter, the bolt 522 is set in the retention portion 520b of the opening 520, where the enlarged head 522a prevents removal therefrom along an axis of the bolt 522. A lever or actuator 524, which in some examples may include an over-center mechanism, may then be actuated so as to draw the adapter 500 in tight contact with the interface 512 of the imaging system 516. Other fixation implements such as bayonet mechanisms, robust electromagnets, or other systems may be utilized. A supplemental lock 530 (here in the form of a button) may be configured to engage with the latch mechanism 510 to prevent inadvertent disengagement thereof. FIG. 8C is an upright rear view of the latch mechanism 510 of the adapter 500 of FIG. 8A. In this figure, the difference in relative diameter or size of the enlarged head 522a as compared to the bolt 522 is readily discernible.

Figure 8D:
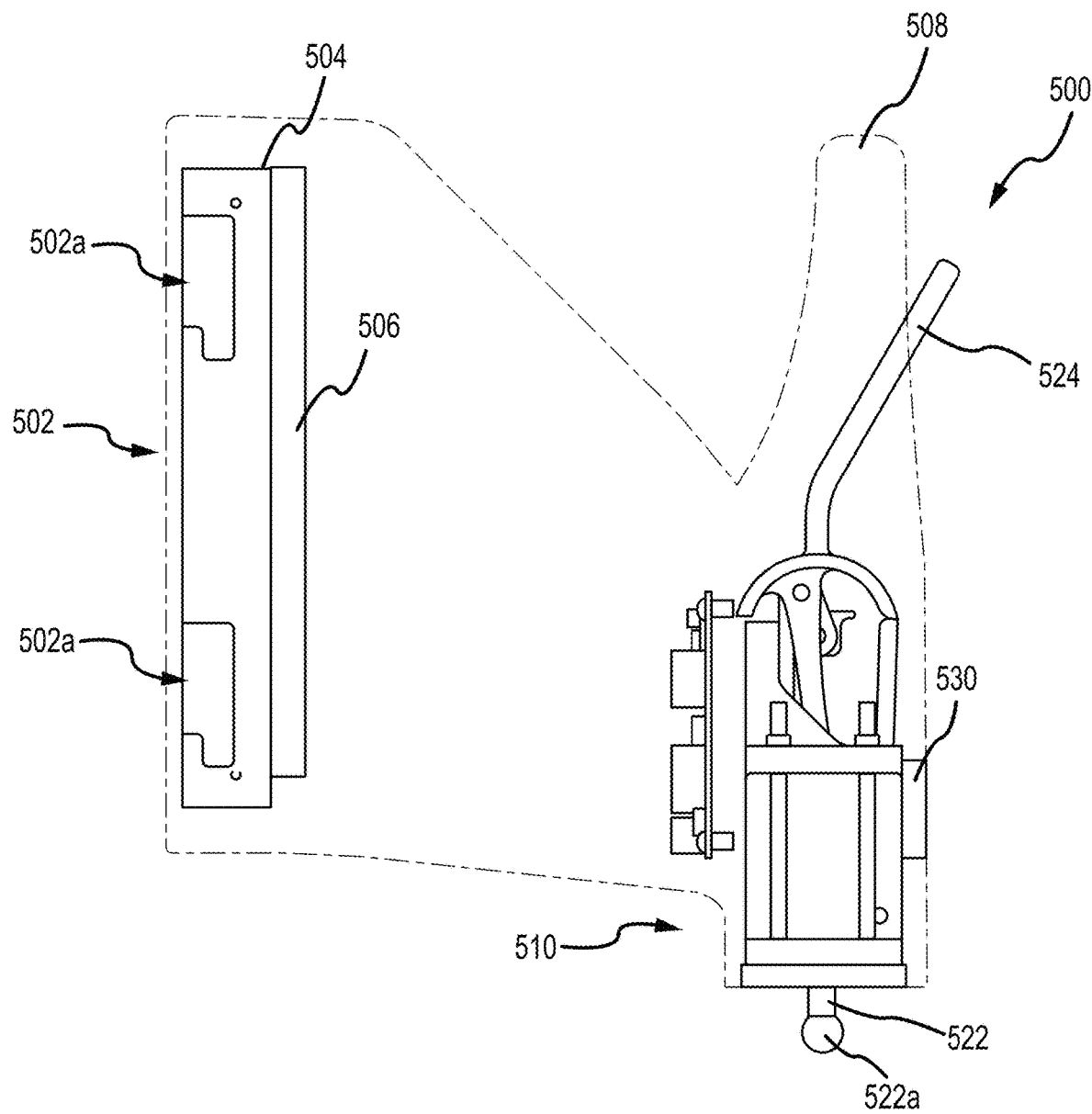
FIG. 8D is a top or bottom view of the adapter of FIG. 8A.
Figure 8E:
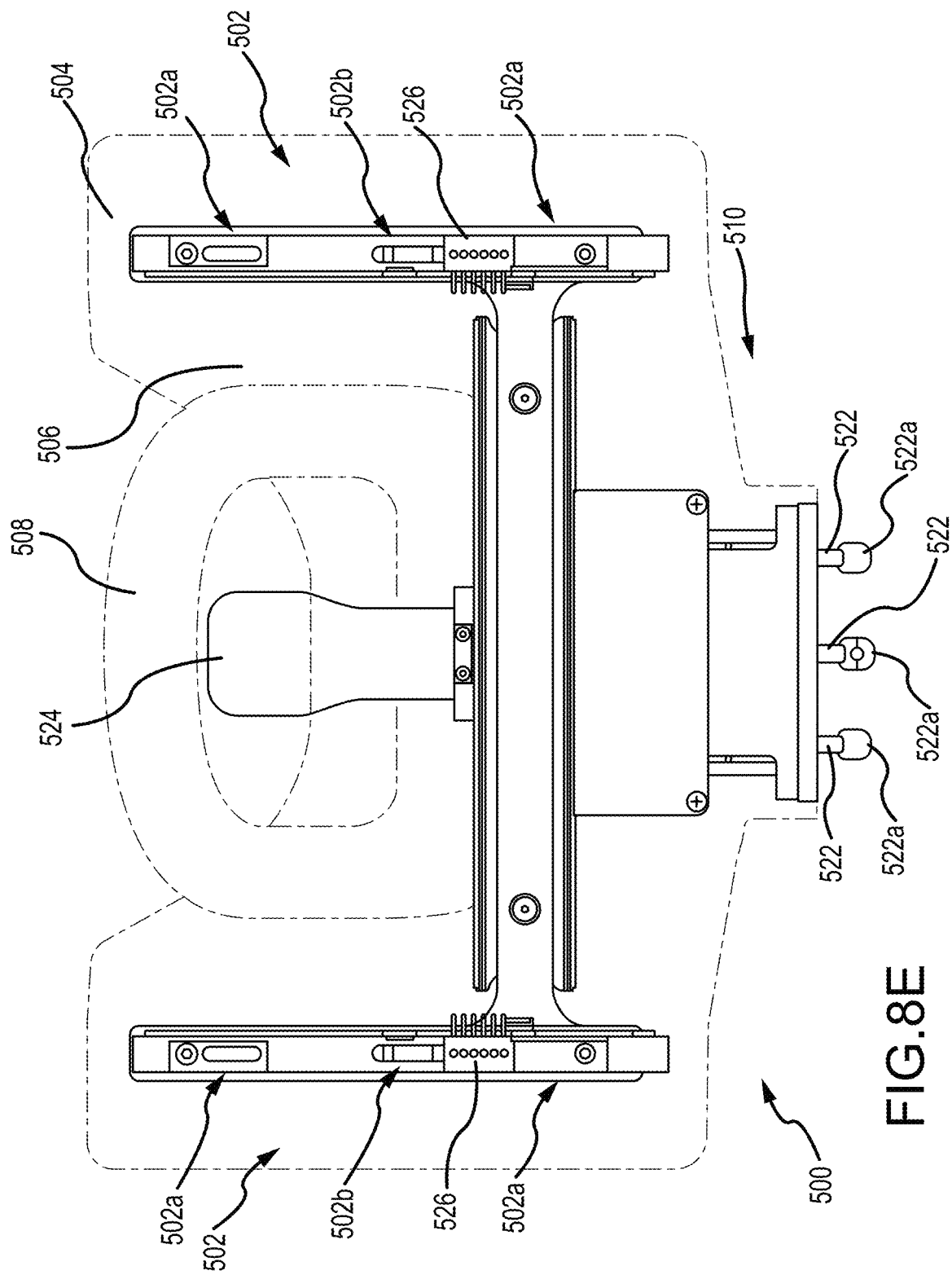
FIG. 8E is a front view of the adapter of FIG. 8A.

FIG. 8D is a top or bottom view of the adapter 500 of FIG. 8A. The adapter body 504 includes two keepers 502, as described elsewhere herein, though only a single keeper is shown in this view. The keepers 502 are disposed such that a plurality of attachment element hook openings 502a are formed at the front side of the adapter 500, along with at least one latch opening 502b. These openings 502a, 502b are configured to receive a corresponding number of components projecting from a biopsy guidance module (not shown) such as attachment elements (e.g., hooks) or latches. FIG. 8E is a front view of the adapter 500 of FIG. 8A and depicts more clearly depicts an electrical contact 526 at each of the two keepers 502. As described in the context of FIG. 8F, the electrical contacts 526 are configured to be communicatively coupled to corresponding contacts on the biopsy guidance module (not shown) when the biopsy guidance module is selectively engaged with the adapter 500. This allows for the transmission of power and control signals between the biopsy guidance module and the imaging system (e.g., via the umbilical cord depicted in FIGS. 6A and 6B).

Figure 8F:
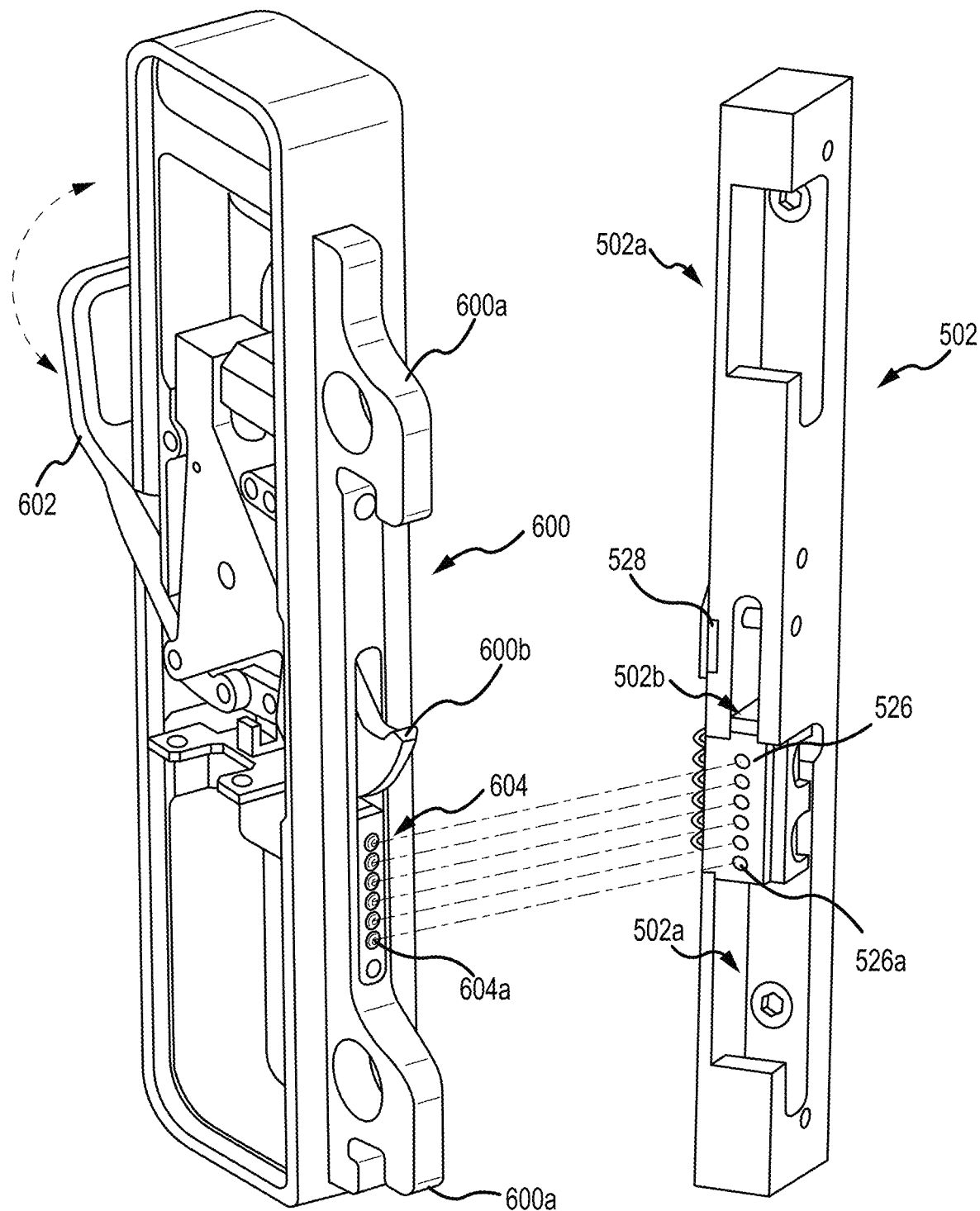
FIG. 8F is a partial exploded perspective view of a keeper of the adapter of FIG. 8A and the module latch of a treatment guidance module.

FIG. 8F is a partial exploded perspective view of a keeper 502 of the adapter of FIG. 8A and the latch module 600 of a treatment guidance module. In FIG. 8F, only the relevant structural components are depicted for clarity (e.g., the adapter and biopsy guidance module are not shown). As described above, the keeper 502 includes at least one hook opening 502a and at least one latch opening 502b. An electrical contact pad 526 including a plurality of electrical contacts 526a is disposed on a front face of the keeper 502. A physical switch, proximity sensor, or other sensor 528 is disposed at or near the latch opening 502b. The hook opening 502a is configured to receive a hook 600a extending from the latch module 600 of the biopsy guidance module. The latch opening 502b is configured to receive a latch 600b that is selectively extended from the latch module 600 by actuation of an actuator 602 thereon. Extending the latch 600b into the latch opening 502b draws the latch module 600 (and biopsy guidance module) tight to the keeper 502 (of the adapter), thus ensuring contact between the plurality of electrical contacts 526a and a corresponding number of contacts 604a on the latch module 600. Although an equal number of contacts 604a are depicted in FIG. 8F, a different number of contacts may be utilized, and may be contained in an exposed area 604 of the latch module 600. Either or both sets of contacts 526a/604a may be spring biased to ensure adequate contact therebetween.

Figure 9:
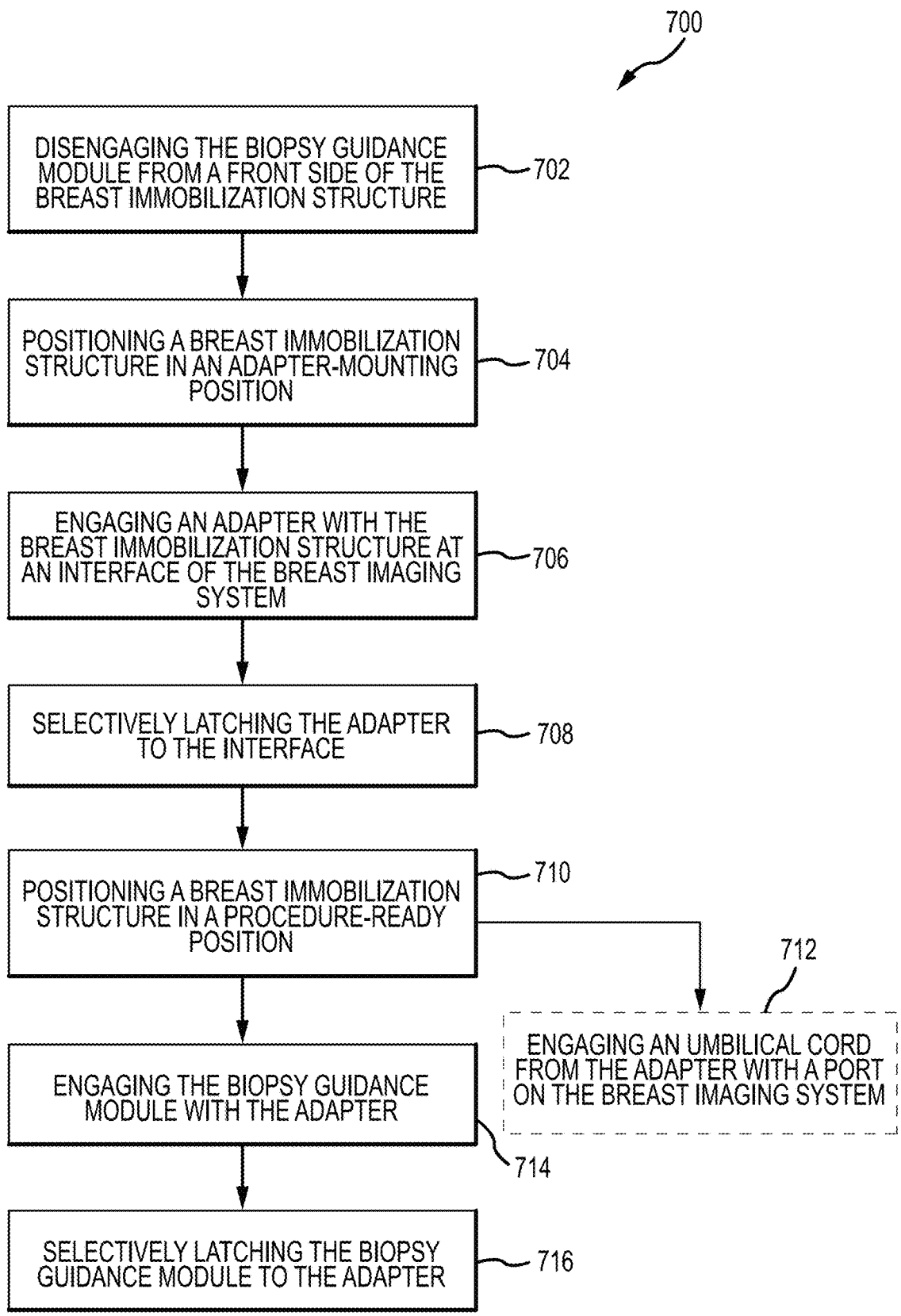
FIG. 9 depicts a method of attaching a treatment guidance module to an x-ray imaging system.
Figure 10B:
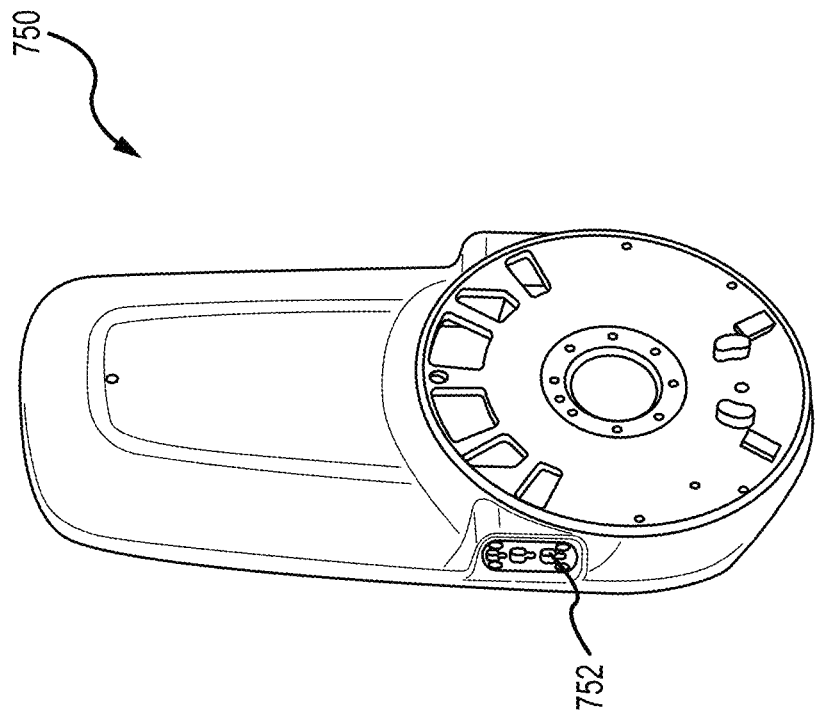
FIGS. 10A and 10B depict rear partial perspective views of a breast immobilization structure of an x-ray imaging system, in an adapter mounting position and a procedure-ready position, respectively.
Figure 10A:
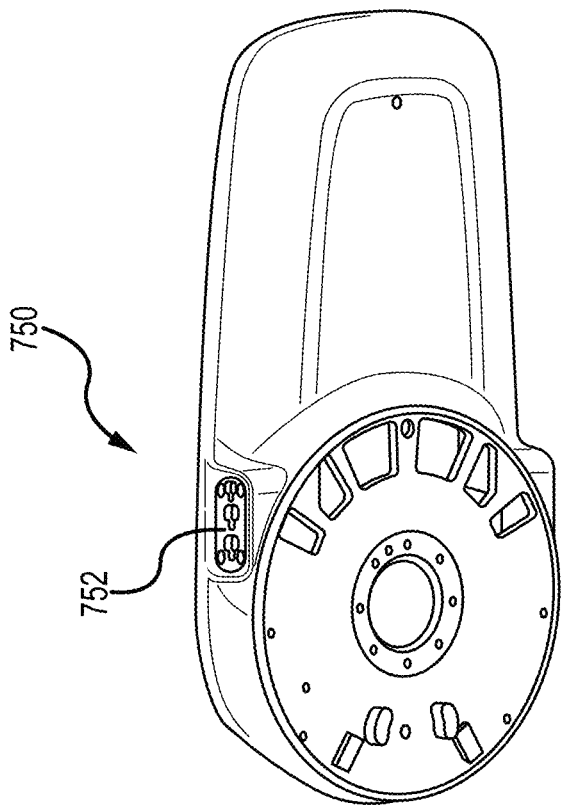

FIG. 9 depicts a method 700 of attaching a treatment guidance module to a breast imaging system. The imaging system may be as depicted herein, and include for example, a breast immobilization structure that includes a breast support platform. The breast imaging system may have secured to a central location of the front side of the breast immobilization structure, a biopsy guidance module or other treatment module. Such a configuration is depicted for example in FIG. 3A. As such, the method 700 may begin with optional operation 702, disengaging the biopsy guidance module from a front side of the breast immobilization structure. In examples, where the biopsy guidance module is not engaged with the imaging system, the method 700 may begin with operation 704, positioning a breast immobilization structure in an adapter-mounting position. Such a position is depicted in FIG. 10A, which depicts a partial rear view of the breast immobilization structure 750. In the adapter-mounting position, the breast immobilization structure 750 is rotated such that the breast support platform (not shown in FIG. 10A) is disposed at an angle to the horizontal. This angle may be about 90°, about 85°, about 80°, about 75°, or about 70° from the horizontal. In general, positioning the breast support platform at such an angle may make the interface plate 752 more readily accessible for attachment of the adapter and/or the biopsy guidance module. The position depicted in FIG. 10A is particularly advantageous because the (relatively lightweight) adapter may be connected to the interface plate 752, then the (somewhat heavier) biopsy guidance module may be held with the handles oriented vertically for easy attachment to the adapter. The breast immobilization structure 750 may be disposed in this position automatically, for example, by a technologist pressing a button on the breast imaging system, or the breast immobilization structure 750 may be selectively rotated to the desired position.

Thereafter, operation 706 is performed, which includes engaging the adapter with the breast immobilization structure 750 at an interface of the breast imaging system. This may be performed by a technologist by lifting the adapter and engaging the latch assembly thereon with the interface plate 752 and may optionally include engaging a supplemental lock to further secure the adapter. Once engaged, operation 708 is performed, selectively latching the adapter to the interface plate 752, which robustly secures those two components. Thereafter, the breast immobilization structure 750 is positioned in a procedure-ready position, operation 710, which is depicted in FIG. 10B. As used herein, the term "procedure-ready" means a position where a patient may have her breast immobilized in the breast immobilization structure 750 and a procedure such as an imaging procedure or biopsy procedure or other treatment or procedure may be performed. Typically, imaging occurs prior to biopsy. In another example, positioning the breast immobilization structure 750 in the procedure-ready position may include operation 712, engaging an umbilical cord from the adapter with a port on the breast imaging system.

The precise angular positions of the immobilization structure 750 when in the adapter-mounting position and the procedure-ready position may be as required or desired for a particular application. Further, the above description describes the positions in the context of the breast support platform. In another example, the adapter-mounting position and the procedure-ready position may be described in the context of a position of the interface plate 752. For example, in the procedure-ready position, the interface plate 752 is substantially vertical, while in the adapter-mounting position, the interface plate 752 is disposed at an angle to the procedure-ready position. In examples, the angle may be about 90°, about 85°, about 80°, about 75°, or about 70°. The adapter-mounting position may be any position where the adapter may be more easily mounted to the breast immobilization structure. The method 700 continues with operation 714, engaging the biopsy guidance module with the adapter. The biopsy guidance module may be selectively engaged to the adapter in operation 716, thereby readying the system for further procedures on the breast of a patient.

Figure 11A:
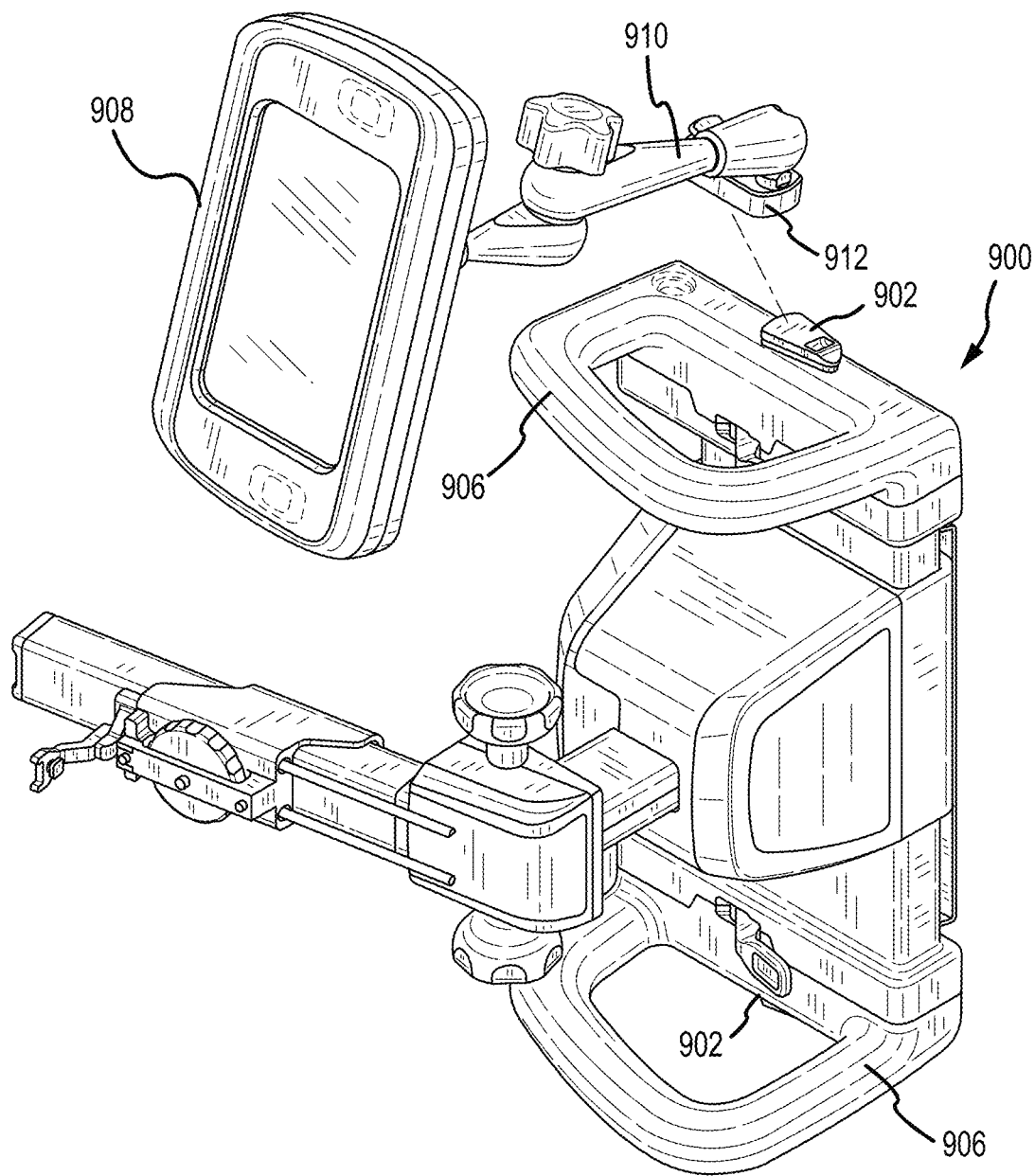
FIG. 11A is a perspective view of another example of a biopsy guidance module.

FIG. 11A is a perspective view of another example of a biopsy guidance module 900. The biopsy guidance module 900 is similar to that depicted in the context of FIGS. 1-5, and may be used in conjunction a biopsy device. The biopsy guidance module 900 may include a bracket 902 that is disposed on one or both sides of a housing 904 of the module 900. In examples, the brackets 902 may be disposed near the handles 906, but other locations are contemplated. By disposing a bracket 902 on both sides of the housing 904, a biopsy controller 908 may be positioned on either side of the biopsy guidance module 900, as required or desired for a particular procedure, and which side of a compression arm the biopsy guidance module 900 is mounted. The controller 908 may be se secured to an articulating arm 910 so as to enable further positioning by a technologist during biopsy procedures. A terminal end of the articulating arm 910 may include a mount 912 that may be removably engaged with either bracket 902. The depicted configuration utilizing the bracket 902 may present certain advantages to the technologist, in that the brackets 902 are not disposed on the handles 906, thus leaving those unobstructed to be gripped more easily. The biopsy guidance module 900 also includes a holster mount 920, as described in FIG. 11B.

Figure 11B:
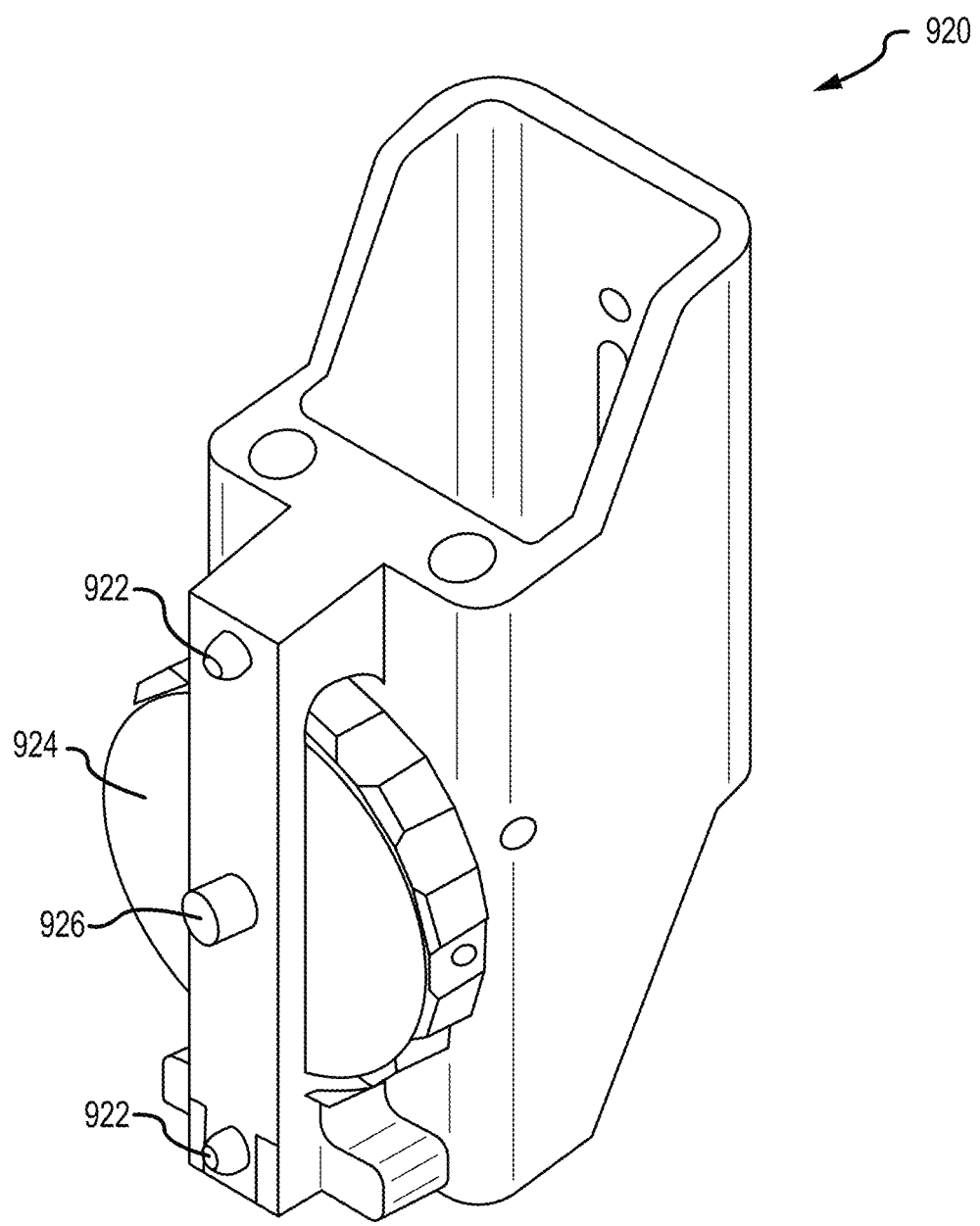
FIG. 11B is a perspective view of a quick-connect holster mount for a treatment guidance module.

FIG. 11B is a perspective view of a quick-connect holster mount 920 for mounting a treatment device (not shown), such as a biopsy device. The mount 920 includes two registration pins 922 that may mate with two registration openings on the biopsy device. Once registers, a wheel 924 may be manually rotated by the medical professional. Rotation of the wheel 924 rotates a mating screw 926 connected thereto. The mating screw 926 engages with a threaded opening on the biopsy device for fast attachment thereof to the mount 920.

Illustrative examples of the systems and methods described herein are provided below. An embodiment of the system or method described herein may include any one or more, and any combination of, the clauses described below:

Clause 1. An adapter for securing a biopsy guidance module to a breast imaging system, the adapter comprising: an adapter body comprising a first side and an opposite second side; an armature extending from the first side of the body; a latch mechanism disposed proximate an end of the armature distal from the first side of the body, wherein the latch mechanism comprises an adapter latch and an actuator, wherein the adapter latch is configured to engage an interface on the breast imaging system and wherein the actuator is engaged with the adapter latch to move the adapter latch from an unlocked position to a locked position, wherein in the locked position, the adapter latch is releasably engaged with the interface; and a keeper disposed on the second side of the body, wherein the keeper is configured to receive a module latch from the biopsy guidance module.

Clause 2. The adapter of clause 1, wherein the keeper comprises a plurality of openings and wherein one of the plurality of openings is configured to receive the module latch.

Clause 3. The adapter of clause 2, further comprising a sensor disposed in the opening configured to receive the module latch, wherein the sensor is configured to detect a position of the module latch.

Clause 4. The adapter of any of clauses 1-3, further comprising a first plurality of electrical contacts disposed to contact a second plurality of electrical contacts disposed on the biopsy guidance module.

Clause 5. The adapter of any of clauses 1-4, further comprising an umbilical cord extending from the adapter, wherein the umbilical cord is communicatively coupled to at least one of the first plurality of electrical contacts.

Clause 6. The adapter of any of clauses 1-5, wherein the keeper comprises a pair of keepers, wherein each of the pair of keepers are disposed proximate opposite ends of the second side of the body.

Clause 7. The adapter of any of clauses 1-6, further comprising a hanger disposed proximate the end of the armature for liftably engaging the adapter body with the interface of the breast imaging system.

Clause 8. The adapter of any of clauses 1-7, wherein the latch mechanism comprises an over-center mechanism.

Clause 9. A breast imaging system comprising: a gantry; an x-ray source rotatably coupled to the gantry; a breast immobilization structure rotatably coupled to the gantry independent of the x-ray source, wherein the breast immobilization structure comprises: a breast support platform; a breast immobilization paddle movably coupled to a front side of the breast immobilization structure and movably engaged with the front side of the breast immobilization structure to move substantially orthogonally relative to the breast support platform; and an pair of interfaces on at least one of a rear side and two lateral sides of the breast immobilization structure for selectively operably connecting an adapter for a biopsy guidance module to the breast immobilization structure; and an x-ray detector disposed below the breast support platform.

Clause 10. The breast imaging system of clause 9, wherein: a first interface of the pair of interfaces is disposed on a rear side of the breast immobilization structure, on a first side of a dividing axis of the breast immobilization structure; and a second interface of the pair of interfaces is disposed on a rear side of the breast immobilization structure, on a second side of the dividing axis of the breast immobilization structure.

Clause 11. The breast imaging system of clause 10, wherein the first interface comprises a first plate facing towards a first lateral side of the two lateral sides of the breast imaging system, and wherein the second interface comprises a second plate facing towards a second lateral side of the two lateral sides of the breast imaging system.

Clause 12. The breast imaging system of any of clauses 9-11, wherein each of the pair of interfaces comprise an interface keeper for receiving an adapter latch on the adapter.

Clause 13. The breast imaging system of any of clauses 9-12, wherein each of the pair of interfaces comprise a hanger structure for selectively engaging the adapter with the interface.

Clause 14. The breast imaging system of clause 13, wherein hanger structure comprises an opening in each of the pair of interfaces.

Clause 15. The breast imaging system of any of clauses 9-14, wherein the breast imaging system comprises two substantially identical umbilical ports.

Clause 16. A method of attaching a biopsy guidance module to a breast imaging system having a breast immobilization structure comprising a breast support platform, the method comprising: positioning a breast immobilization structure in an adapter-mounting position; engaging an adapter with the breast immobilization structure at an interface of the breast imaging system; selectively latching the adapter to the interface; positioning the breast immobilization structure in a procedure-ready position; engaging the biopsy guidance module with the adapter; and selectively latching the biopsy guidance module to the adapter.

Clause 17. The method of clause 16, wherein positioning the breast immobilization structure in the procedure-ready position comprises engaging an umbilical cord from the adapter with a port on the breast imaging system.

Clause 18. The method of any of clauses 16-17, wherein: in the procedure-ready position, the interface is substantially vertical; and in the adapter-mounting position, the interface is disposed at an angle to the procedure-ready position.

Clause 19. The method of clause 18, wherein the angle is approximately 90 degrees.

Clause 20. The method of any of clauses 16-19, further comprising disengaging the biopsy guidance module from a front side of the breast immobilization structure, prior to engaging the biopsy guidance module with the adapter.

Clause 21. The method of any of clauses 16-20, wherein engaging the adapter with the breast immobilization structure comprises activating a supplemental lock.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. An adapter for securing a biopsy guidance module to a breast imaging system, the adapter comprising:
    an adapter body comprising a first side and an opposite second side;
    an armature extending from the first side of the adapter body;
    a latch mechanism disposed proximate an end of the armature distal from the first side of the adapter body, wherein the latch mechanism comprises an adapter latch and an actuator, wherein the adapter latch is configured to engage an interface on the breast imaging system and wherein the actuator is engaged with the adapter latch to move the adapter latch from an unlocked position to a locked position, wherein in the locked position, the adapter latch is releasably engaged with the interface; and
    a keeper disposed on the second side of the adapter body, wherein the keeper is configured to receive a module latch from the biopsy guidance module.

2. The adapter of claim 1, wherein the keeper comprises a plurality of openings and wherein one of the plurality of openings is configured to receive the module latch.

3. The adapter of claim 2, further comprising a sensor disposed in the opening configured to receive the module latch, wherein the sensor is configured to detect a position of the module latch.

4. The adapter of claim 1, further comprising a first plurality of electrical contacts disposed to contact a second plurality of electrical contacts disposed on the biopsy guidance module.

5. The adapter of claim 4, further comprising an umbilical cord extending from the adapter, wherein the umbilical cord is communicatively coupled to at least one of the first plurality of electrical contacts.

6. The adapter of claim 1, wherein the keeper comprises a pair of keepers, wherein each of the pair of keepers are disposed proximate opposite ends of the second side of the adapter body.

7. The adapter of claim 1, further comprising a hanger disposed proximate the end of the armature for liftably engaging the adapter body with the interface of the breast imaging system.

8. The adapter of claim 1, wherein the latch mechanism comprises an over-center mechanism.

9. The adapter of claim 3, wherein the sensor includes a physical switch.

10. The adapter of claim 3, wherein the sensor includes a proximity sensor.

11. The adapter of claim 4, wherein the keeper includes the first plurality of electrical contacts.

12. The adapter of claim 1, further comprising a supplemental lock configured to selectively prevent movement of the actuator.

13. The adapter of claim 1, further comprising a handle disposed on the first side of the adapter body.

14. The adapter of claim 1, further comprising a strut supporting the keeper on the second side of the body.

15. The adapter of claim 6, further comprising a pair of struts, each respectively supporting the respective keeper of the pair of keepers.

16. The adapter of claim 15, further comprising a tie spanning the pair of struts.

17. The adapter of claim 1, wherein the adapter latch includes one or more locking bolts.

* * * * *